US012628101B2

(12) United States Patent
Zorgui et al.

(10) Patent No.: US 12,628,101 B2
(45) Date of Patent: May 12, 2026

(54) SCHEDULING REQUEST RESPONSE MONITORING ALIGNMENT FOR ENERGY SAVINGS

(71) Applicant: QUALCOMM Incorporated, San Diego, CA (US)

(72) Inventors: Marwen Zorgui, San Diego, CA (US); Ahmed Attia Abotabl, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 691 days.

(21) Appl. No.: 18/151,349

(22) Filed: Jan. 6, 2023

(65) Prior Publication Data

US 2024/0236886 A1 Jul. 11, 2024

(51) Int. Cl.
*H04W 72/12* (2023.01)
*H04W 56/00* (2009.01)
*H04W 72/1268* (2023.01)

(52) U.S. Cl.
CPC ... *H04W 56/0015* (2013.01); *H04W 72/1268* (2013.01)

(58) Field of Classification Search
CPC ......... H04W 56/0015; H04W 72/1268; H04W 72/23
See application file for complete search history.

(56) References Cited

U.S. PATENT DOCUMENTS

| | | | |
|---|---|---|---|
| 2017/0142751 A1* | 5/2017 | Liu | H04L 27/2613 |
| 2020/0281018 A1* | 9/2020 | Li | H04W 80/08 |
| 2021/0076445 A1* | 3/2021 | Tsai | H04W 74/0833 |
| 2023/0284065 A1* | 9/2023 | Zhou | H04W 24/10 370/252 |
| 2025/0220628 A1* | 7/2025 | Khoshkholgh Dashtaki | H04W 64/00 |

* cited by examiner

*Primary Examiner* — Lan-Huong Truong
(74) *Attorney, Agent, or Firm* — Holland & Hart LLP

(57) ABSTRACT

Methods, systems, and devices for wireless communication are described. A user equipment (UE) may identify a synchronization signal block (SSB) timing for receiving SSBs in accordance with periodic SSB transmission occasions. The UE may transmit a scheduling request (SR) requesting an uplink grant for an uplink transmission. The UE may start a timer associated with monitoring for the uplink grant from a network entity based on transmitting the SR, where starting the timer may be delayed with respect to the SR transmission. For example, the UE may start the timer after the SR is transmitted and at a first time that satisfies a first threshold duration prior to a first SSB transmission occasion of the periodic SSB transmission occasions. In some cases, the UE may start the timer based on the SR being transmitted at a time that satisfies a second threshold duration after an SSB transmission occasion.

28 Claims, 16 Drawing Sheets

220-a

210

115-a 215　　　205　　　220-b 105-a

| | Synchronization Signal Block 205 |
| --- | --- |
| | Scheduling Request 210 |
| | Uplink Grant 215 |

200

510

520

515

505

500

Communications Manager

SSB Component

1025

Receiver

1010

Scheduling Request Manager

1030

Transmitter

1015

Uplink Grant Component

1035

1020

1005

1000

130

105

115

Network
Entity

Transceiver

1210

Antenna

1215

Communications
Manager

1220

Memory

Code

1230

1225

1240

Processor

1235

1205

1200

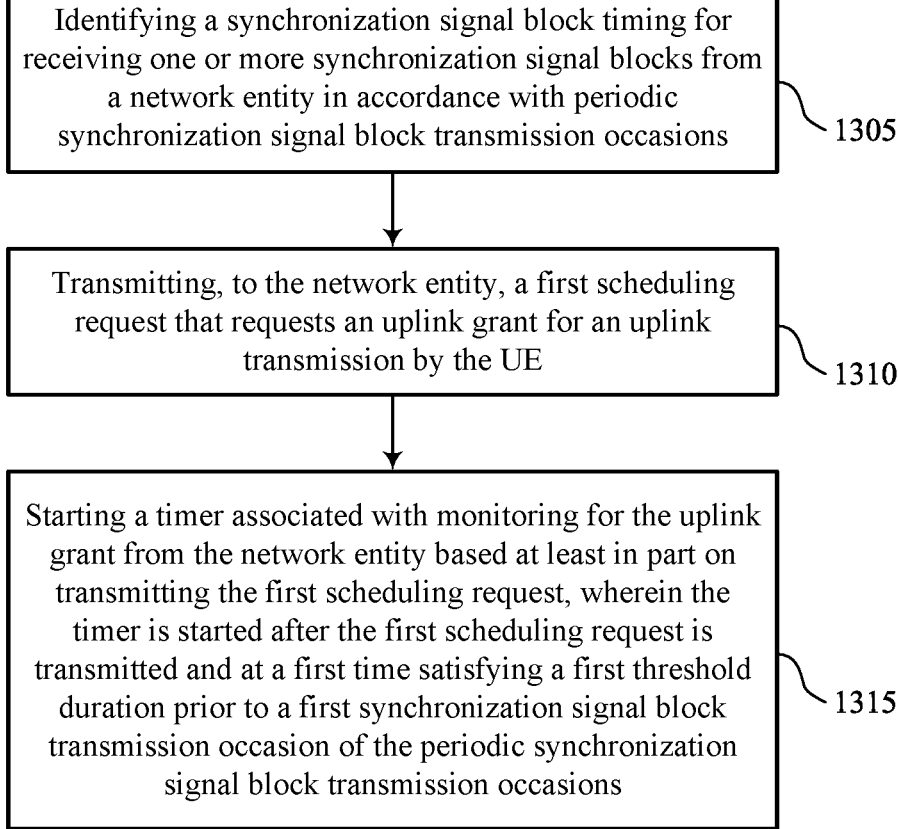

Identifying a synchronization signal block timing for receiving one or more synchronization signal blocks from a network entity in accordance with periodic synchronization signal block transmission occasions

1305

Transmitting, to the network entity, a first scheduling request that requests an uplink grant for an uplink transmission by the UE

1310

Starting a timer associated with monitoring for the uplink grant from the network entity based at least in part on transmitting the first scheduling request, wherein the timer is started after the first scheduling request is transmitted and at a first time satisfying a first threshold duration prior to a first synchronization signal block transmission occasion of the periodic synchronization signal block transmission occasions

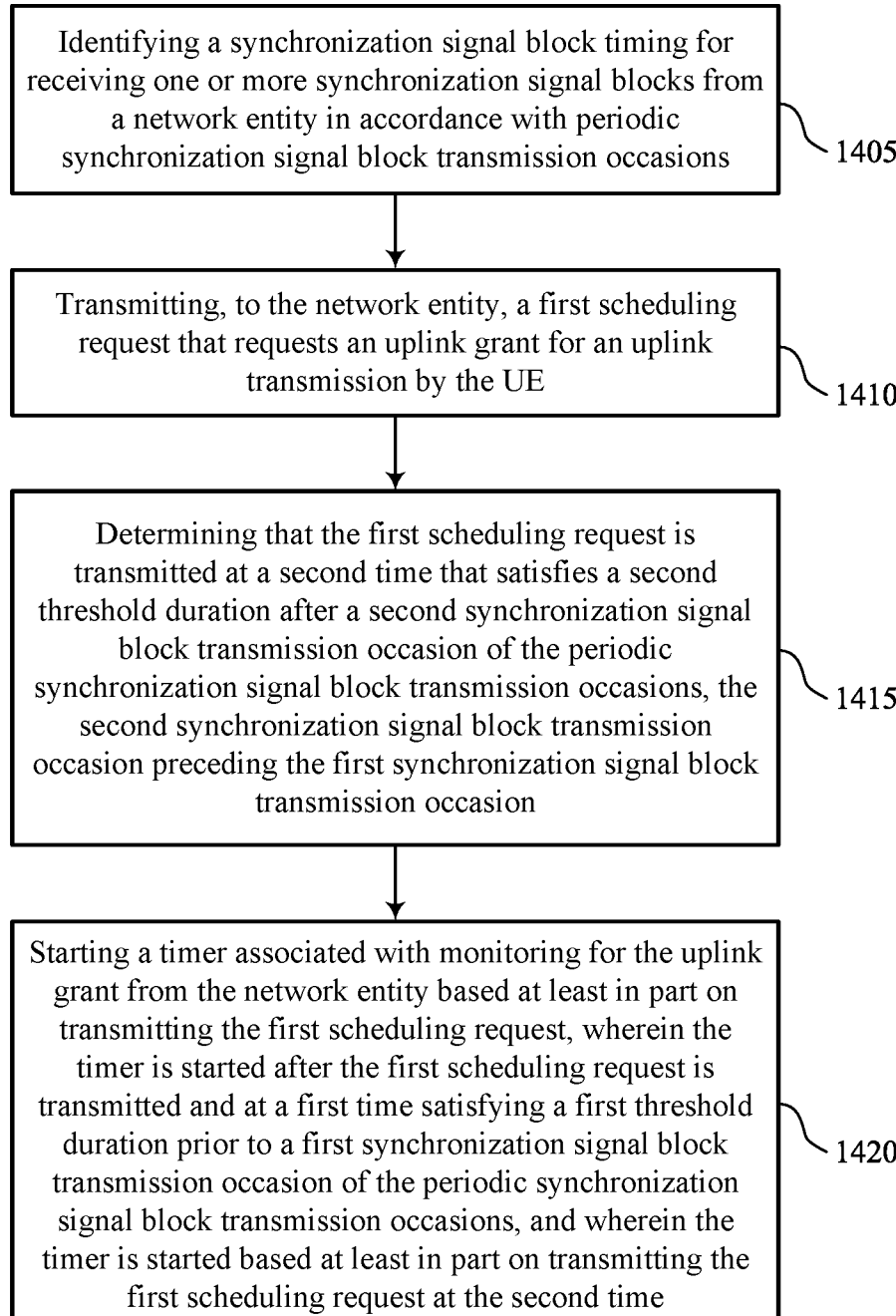

Identifying a synchronization signal block timing for receiving one or more synchronization signal blocks from a network entity in accordance with periodic synchronization signal block transmission occasions

1405

Transmitting, to the network entity, a first scheduling request that requests an uplink grant for an uplink transmission by the UE

1410

Determining that the first scheduling request is transmitted at a second time that satisfies a second threshold duration after a second synchronization signal block transmission occasion of the periodic synchronization signal block transmission occasions, the second synchronization signal block transmission occasion preceding the first synchronization signal block transmission occasion

1415

Starting a timer associated with monitoring for the uplink grant from the network entity based at least in part on transmitting the first scheduling request, wherein the timer is started after the first scheduling request is transmitted and at a first time satisfying a first threshold duration prior to a first synchronization signal block transmission occasion of the periodic synchronization signal block transmission occasions, and wherein the timer is started based at least in part on transmitting the first scheduling request at the second time

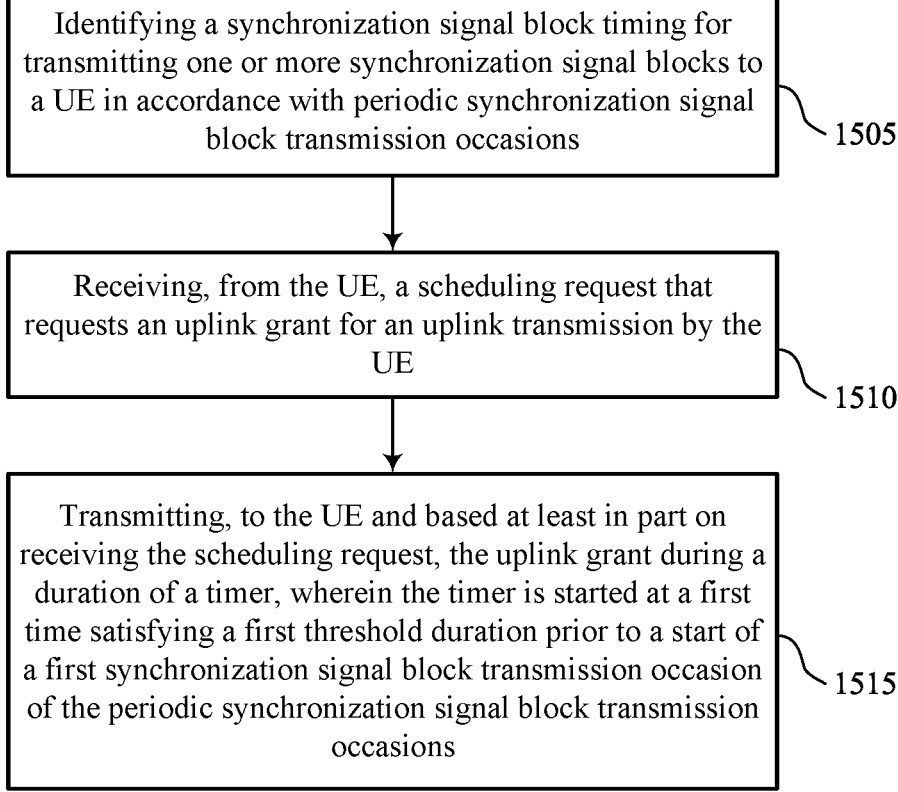

Identifying a synchronization signal block timing for transmitting one or more synchronization signal blocks to a UE in accordance with periodic synchronization signal block transmission occasions

1505

Receiving, from the UE, a scheduling request that requests an uplink grant for an uplink transmission by the UE

1510

Transmitting, to the UE and based at least in part on receiving the scheduling request, the uplink grant during a duration of a timer, wherein the timer is started at a first time satisfying a first threshold duration prior to a start of a first synchronization signal block transmission occasion of the periodic synchronization signal block transmission occasions

SCHEDULING REQUEST RESPONSE MONITORING ALIGNMENT FOR ENERGY SAVINGS

FIELD OF TECHNOLOGY

The following relates to wireless communication, including scheduling request response monitoring alignment for energy savings.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support scheduling request (SR) response monitoring alignment for energy savings. For example, the described techniques provide for a user equipment (UE) to identify a synchronization signal block (SSB) timing for receiving SSBs from a network entity in accordance with periodic SSB transmission occasions. The UE may transmit an SR requesting an uplink grant for an uplink transmission by the UE. The UE may start a timer associated with monitoring for the uplink grant from the network entity based on transmitting the SR, and the timer may be started after transmitting the SR and some duration prior to an SSB transmission occasion. For example, the timer may be started at a first time that satisfies a first threshold duration prior to a first SSB transmission occasion of the periodic SSB transmission occasions. In some cases, the UE may start the timer based on the SR being transmitted at a second time that satisfies a second threshold duration after a second SSB transmission occasion, where the second SSB transmission occasion is prior to the SR and the first SSB transmission occasion.

An apparatus for wireless communication at a UE is described. The apparatus may include a processor and a memory coupled with the processor, with instructions stored in the memory. The instructions may be executable by the processor to cause the apparatus to identify an SSB timing for receiving one or more SSBs from a network entity in accordance with periodic SSB transmission occasions, transmit, to the network entity, a first SR that requests an uplink grant for an uplink transmission by the UE, and start a timer associated with monitoring for the uplink grant from the network entity based on transmitting the first SR, where the timer is started after the first SR is transmitted and at a first time satisfying a first threshold duration prior to a first SSB transmission occasion of the periodic SSB transmission occasions.

A method for wireless communication at a UE is described. The method may include identifying an SSB timing for receiving one or more SSBs from a network entity in accordance with periodic SSB transmission occasions, transmitting, to the network entity, a first SR that requests an uplink grant for an uplink transmission by the UE, and starting a timer associated with monitoring for the uplink grant from the network entity based on transmitting the first SR, where the timer is started after the first SR is transmitted and at a first time satisfying a first threshold duration prior to a first SSB transmission occasion of the periodic SSB transmission occasions.

Another apparatus for wireless communication at a UE is described. The apparatus may include means for identifying an SSB timing for receiving one or more SSBs from a network entity in accordance with periodic SSB transmission occasions, means for transmitting, to the network entity, a first SR that requests an uplink grant for an uplink transmission by the UE, and means for starting a timer associated with monitoring for the uplink grant from the network entity based on transmitting the first SR, where the timer is started after the first SR is transmitted and at a first time satisfying a first threshold duration prior to a first SSB transmission occasion of the periodic SSB transmission occasions.

A non-transitory computer-readable medium storing code for wireless communication at a UE is described. The code may include instructions executable by a processor to identify an SSB timing for receiving one or more SSBs from a network entity in accordance with periodic SSB transmission occasions, transmit, to the network entity, a first SR that requests an uplink grant for an uplink transmission by the UE, and start a timer associated with monitoring for the uplink grant from the network entity based on transmitting the first SR, where the timer is started after the first SR is transmitted and at a first time satisfying a first threshold duration prior to a first SSB transmission occasion of the periodic SSB transmission occasions.

Some examples of the method, apparatuses, and non-transitory computer-readable medium described herein may further include operations, features, means, or instructions for determining that the first SR may be transmitted at a second time that satisfies a second threshold duration after a second SSB transmission occasion of the periodic SSB transmission occasions, the second SSB transmission occasion preceding the first SSB transmission occasion, where the timer may be started based on transmitting the first SR at the second time.

Some examples of the method, apparatuses, and non-transitory computer-readable medium described herein may further include operations, features, means, or instructions for selecting a first value for the first threshold duration or a second value for the second threshold duration, or both, based on a quantity of one or more logical channels for which data may be available for transmission by the UE.

Some examples of the method, apparatuses, and non-transitory computer-readable medium described herein may further include operations, features, means, or instructions for receiving a first control message indicating a configuration of the first value or the second value, or both, where selecting the first value or the second value, or both, may be based on the configuration.

Some examples of the method, apparatuses, and non-transitory computer-readable medium described herein may further include operations, features, means, or instructions for receiving a second control message indicating whether the UE may be to select the first value, the second value, or both based on the quantity of the one or more logical channels, where selecting the first value or the second value, or both, may be based on the second control message.

In some examples of the method, apparatuses, and non-transitory computer-readable medium described herein, the second control message includes a radio resource control message, a medium access control-control element, or downlink control information.

Some examples of the method, apparatuses, and non-transitory computer-readable medium described herein may further include operations, features, means, or instructions for receiving a message including an indication of the first threshold duration, the second threshold duration, or both, where the timer may be started based on the indication.

In some examples of the method, apparatuses, and non-transitory computer-readable medium described herein, the message includes a radio resource control message, a system information message, downlink control information, or a medium access control message, or any combination thereof.

Some examples of the method, apparatuses, and non-transitory computer-readable medium described herein may further include operations, features, means, or instructions for receiving a SR configuration that includes a field indicating whether the timer is to be started at a time that satisfies the first threshold duration prior to an SSB transmission occasion of the periodic SSB transmission occasions, where starting the timer may be based on the field of the SR configuration.

Some examples of the method, apparatuses, and non-transitory computer-readable medium described herein may further include operations, features, means, or instructions for transmitting a request associated with starting the timer prior to the first SSB transmission occasion and receiving, in response to the request, a message indicating that the timer is to be started at the first time based on the request.

Some examples of the method, apparatuses, and non-transitory computer-readable medium described herein may further include operations, features, means, or instructions for monitoring for the uplink grant for a duration of the timer based on starting the timer and transmitting the uplink transmission based on receiving the uplink grant during the duration of the timer.

Some examples of the method, apparatuses, and non-transitory computer-readable medium described herein may further include operations, features, means, or instructions for monitoring for the uplink grant during a duration of the timer based on starting the timer and transmitting a second SR based on failing to receive the uplink grant during the duration of the timer.

Some examples of the method, apparatuses, and non-transitory computer-readable medium described herein may further include operations, features, means, or instructions for entering a sleep mode after transmitting the first SR and exiting the sleep mode prior to starting the timer.

Some examples of the method, apparatuses, and non-transitory computer-readable medium described herein may further include operations, features, means, or instructions for refraining from transmitting one or more additional SRs until the timer expires.

An apparatus for wireless communication is described. The apparatus may include a processor and a memory coupled with the processor, with instructions stored in the memory. The instructions may be executable by the processor to cause the apparatus to identify an SSB timing for transmitting one or more SSBs to a UE in accordance with periodic SSB transmission occasions, receive, from the UE, a SR that requests an uplink grant for an uplink transmission by the UE, and transmit, to the UE and based on receiving the SR, the uplink grant during a duration of a timer, where the timer is started at a first time satisfying a first threshold duration prior to a start of a first SSB transmission occasion of the periodic SSB transmission occasions.

A method for wireless communication is described. The method may include identifying an SSB timing for transmitting one or more SSBs to a UE in accordance with periodic SSB transmission occasions, receiving, from the UE, a SR that requests an uplink grant for an uplink transmission by the UE, and transmitting, to the UE and based on receiving the SR, the uplink grant during a duration of a timer, where the timer is started at a first time satisfying a first threshold duration prior to a start of a first SSB transmission occasion of the periodic SSB transmission occasions.

Another apparatus for wireless communication is described. The apparatus may include means for identifying an SSB timing for transmitting one or more SSBs to a UE in accordance with periodic SSB transmission occasions, means for receiving, from the UE, a SR that requests an uplink grant for an uplink transmission by the UE, and means for transmitting, to the UE and based on receiving the SR, the uplink grant during a duration of a timer, where the timer is started at a first time satisfying a first threshold duration prior to a start of a first SSB transmission occasion of the periodic SSB transmission occasions.

A non-transitory computer-readable medium storing code for wireless communication is described. The code may include instructions executable by a processor to identify an SSB timing for transmitting one or more SSBs to a UE in accordance with periodic SSB transmission occasions, receive, from the UE, a SR that requests an uplink grant for an uplink transmission by the UE, and transmit, to the UE and based on receiving the SR, the uplink grant during a duration of a timer, where the timer is started at a first time satisfying a first threshold duration prior to a start of a first SSB transmission occasion of the periodic SSB transmission occasions.

In some examples of the method, apparatuses, and non-transitory computer-readable medium described herein, the SR may be received at a second time that satisfies a second threshold duration after a second SSB transmission occasion of the periodic SSB transmission occasions, the second SSB transmission occasion preceding the first SSB transmission occasion.

Some examples of the method, apparatuses, and non-transitory computer-readable medium described herein may further include operations, features, means, or instructions for transmitting, to the UE, a first control message indicating a configuration associated with selecting a first value for the first threshold duration, a second value for the second threshold duration, or both, based on a quantity of one or more logical channels for which data may be available for transmission by the UE.

Some examples of the method, apparatuses, and non-transitory computer-readable medium described herein may further include operations, features, means, or instructions for transmitting, to the UE, a second control message indicating whether the UE may be to select the first value, the second value, or both based on the quantity of one or more logical channels.

In some examples of the method, apparatuses, and non-transitory computer-readable medium described herein, the second control message includes a radio resource control message, a medium access control-control element, or downlink control information.

Some examples of the method, apparatuses, and non-transitory computer-readable medium described herein may further include operations, features, means, or instructions for transmitting a message including an indication of the first threshold duration, the second threshold duration, or both, where the timer may be started based on the indication.

In some examples of the method, apparatuses, and non-transitory computer-readable medium described herein, the message includes a radio resource control message, a system information message, downlink control information, or a medium access control message, or any combination thereof.

Some examples of the method, apparatuses, and non-transitory computer-readable medium described herein may further include operations, features, means, or instructions for transmitting, to the UE, a SR configuration that includes a field indicating whether the timer is to be started at a time that satisfies the first threshold duration prior to an SSB transmission occasion of the periodic SSB transmission occasions.

Some examples of the method, apparatuses, and non-transitory computer-readable medium described herein may further include operations, features, means, or instructions for receiving the uplink transmission based on transmitting the uplink grant during the duration of the timer.

Some examples of the method, apparatuses, and non-transitory computer-readable medium described herein may further include operations, features, means, or instructions for entering a sleep mode after receiving the SR and exiting the sleep mode prior to transmitting the uplink grant.

Some examples of the method, apparatuses, and non-transitory computer-readable medium described herein may further include operations, features, means, or instructions for receiving a request associated with starting the timer prior to the first SSB transmission occasion and transmitting, in response to the request, a message indicating that the timer is to be started at the first time based on the request.

BRIEF DESCRIPTION OF THE DRAWINGS

FIGS. 13 through 16 illustrate flowcharts showing methods that support SR response monitoring alignment for energy savings in accordance with one or more aspects of the present disclosure.

DETAILED DESCRIPTION

Figure 1:
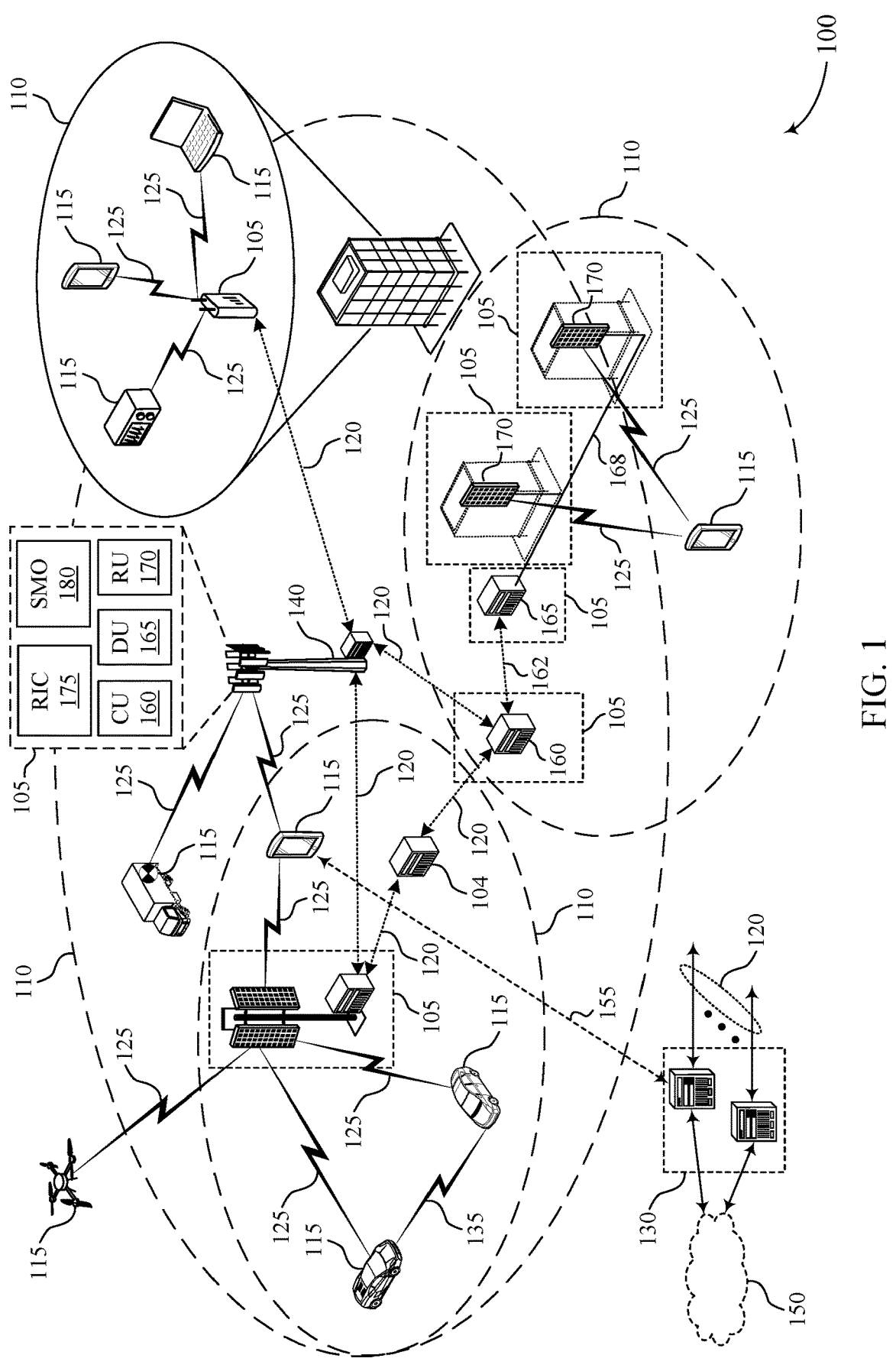
FIG. 1 illustrates an example of a wireless communications system that supports scheduling request (SR) response monitoring alignment for energy savings in accordance with one or more aspects of the present disclosure.

In some cases, operations of a wireless communications systems may be associated with high energy usage and corresponding costs, particularly for systems operating in accordance with fifth generation (5G) systems (e.g., new radio (NR) systems) and other technologies. As such, it may be desirable to employ techniques to improve cost and energy savings during operation of these wireless communications systems. In one example, to reduce energy consumption at a network entity, the network entity may enter a sleep mode for a period of time in order to reduce power consumption if the network entity does not expect to receive or transmit signaling during that period of time. In such cases, data coordination and scheduling, which may include dynamic adaptation of uplink and/or downlink transmissions, may enable the sleep mode and other energy saving techniques at the network entity. The network entity, however, may only enter the sleep mode as scheduling allows. For instance, the network entity may be unable to enter a sleep mode if one or more scheduling requests (SRs) are to be received from a user equipment (UE). Therefore, it may be desirable for the network entity and the UE to coordinate timings of some communications, such as SRs, to allow for scheduling alignment, which may result in increased opportunities for sleep periods at the network entity.

In accordance with examples as described herein, a UE may delay a start of a timer (e.g., an sr-ProhibitTimer) during which the UE is to monitor for signaling (e.g., an uplink grant) from a network entity in response to a transmitted SR. For example, after transmitting a first SR, the UE may delay starting the timer until after a first threshold duration prior to a start of a synchronization signal block (SSB) transmission from the network entity. In some cases (e.g., after delaying the timer), the UE may refrain from transmitting other transmissions to the network entity (e.g., additional SRs) until the timer is started and then expires.

The delay of the timer may result in uplink signaling (e.g., SR transmissions) and/or corresponding downlink transmissions (e.g., an uplink grant) at or around times in which the network entity will already be awake and transmitting downlink signaling (e.g., SSBs). Such techniques may enable the network entity to support a sleep mode (e.g., a micro sleep mode) after receiving the first SR, for example, until the start of the timer, thereby improving power savings at the network entity. In some examples, the UE may also enter a sleep mode during this period, as the UE may not expect to receive signaling until after the start of the timer, which may improve power savings at the UE as well. Accordingly, by delaying the start of the timer associated with monitoring for signaling from the network entity, the UE and the network entity may improve scheduling coordination. For example, signaling exchanged between the UE and the network entity may be coordinated around times during which the network entity may already be in an active state (e.g., to transmit SSBs), which may enable one or both of the UE or the network entity to enter a sleep mode for relatively longer durations and therefore improve power savings and reduce costs associated therewith.

Aspects of the disclosure are initially described in the context of wireless communications systems. Aspects of the disclosure are also described in the context of a signaling diagram and a process flow. Aspects of the disclosure are further illustrated by and described herein with reference to apparatus diagrams, system diagrams, and flowcharts that relate to SR response monitoring alignment for energy savings.

FIG. 1 illustrates an example of a wireless communications system 100 that supports SR response monitoring alignment for energy savings in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support SR response monitoring alignment for energy savings as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 or a network entity 105 may include entering a power saving deep sleep mode when not engaging in active communications, operating using a limited bandwidth (e.g., according to narrowband communications), or any combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier. Additionally, UE 115 or a network entity 105 may in some cases, be configured to operate in other sleep modes, such as light sleep or micro sleep modes (e.g., for time periods during which transmissions are not expected).

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, operations of the wireless communications system 100 may be associated with high energy usage or costs, and it may be desirable to employ techniques to reduce costs and improve energy savings. In one example, to help reduce energy consumption at a network entity 105, the network entity 105 may enter a sleep mode for some period of time to reduce power consumption if the network entity 105 does not expect to receive or transmit signaling for that period of time. However, the network entity 105 may only enter the sleep mode as scheduling may allow. For instance, the network entity 105 may be unable to enter a sleep mode if one or more SRs are to be received from a UE 115. Therefore, it may be desirable for the network entity 105 and the UE 115 to coordinate timings of some communications, such as SRs, to allow for relatively more or relatively longer durations of time for the network entity 105 or the UE 115 to enter sleep mode.

In accordance with examples as described herein, a UE 115 may delay a start of a timer (e.g., an sr-ProhibitTimer) during which the UE 115 is to monitor for signaling (e.g., an uplink grant) from a network entity 105 in response to a transmitted SR. For example, after transmitting a first SR, the UE 115 may delay starting the timer until after a first threshold duration prior to a start of an SSB transmission occasion from the network entity 105. In some cases (e.g., after delaying the timer), the UE 115 may refrain from transmitting other transmissions to the network entity 105 (e.g., additional SRs) until the expiration of the timer. Such techniques may allow the network entity 105 to enable a sleep mode (e.g., a micro sleep mode) after receiving the first SR and until the start of the timer, for example, thereby improving power savings at the network entity 105. In some examples, the UE 115 may also enter a sleep mode during this period, as the UE 115 may not expect to receive signaling until the start of the timer, which may improve power savings at the UE 115 as well. Accordingly, by delaying the start of the timer associated with monitoring for signaling from the network entity 105, the UE 115 and the network entity 105 may improve scheduling coordination. For example, signaling exchanged between the UE 115 and the network entity 105 may be coordinated around times during which the network entity 105 may already be in an active state (e.g., to transmit SSBs), which may enable the UE 115 and/or the network entity 105 to enter a sleep mode for relatively longer durations and therefore improve power savings and reduce costs associated therewith.

Figure 2:
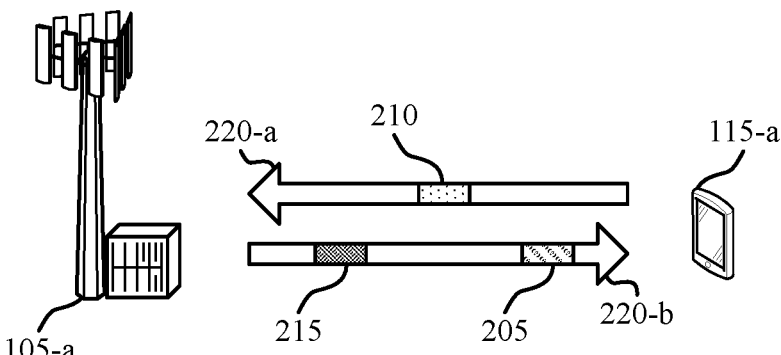
FIG. 2 illustrates an example of a wireless communications system that supports SR response monitoring alignment for energy savings in accordance with one or more aspects of the present disclosure.

FIG. 2 illustrates an example of a wireless communications system 200 that supports SR response monitoring alignment for energy savings in accordance with one or more aspects of the present disclosure. The wireless communications system 200 may implement aspects of the wireless communications system 100. For example, the wireless communications system 200 may illustrate communications between a UE 115-a and a network entity 105-a, which may be examples of the corresponding devices as described herein with reference to FIG. 1. Additionally, the devices illustrated within the wireless communications system 200 may communicate via a communication link 220-a and a communication link 220-b, which may be examples of communication links 125 as described herein with reference to FIG. 1.

The wireless communications system 200 may support transmissions of periodic SSBs 205. For example, the UE 115-a may identify an SSB configuration for receiving one or more SSBs 205 from the network entity 105-a. In some examples, the SSB configuration may indicate a plurality of SSB transmission occasions for reception of SSBs 205 by the UE 115-a from the network entity 105-a. In some cases, identifying the SSB configuration may involve receiving a message indicating the SSB configuration (e.g., or a portion thereof) from the network entity 105-a or another device. For example, the UE 115-a may receive a message (e.g., an information element, such as ServingCellConfigCommon or ServingCellConfigCommonSIB) containing one or more parameters associated with the SSB configuration, which may provide information regarding SSB transmission occasions for receiving one or more SSBs 205. In some cases, the UE 115-a may be configured with the SSB configuration when the UE 115-a is configured (e.g., by the network entity 105-a or another device) with a cell (e.g., a secondary cell, a primary cell, or both) or a cell group (e.g., an additional or secondary cell group). Additionally, or alternatively, the UE 115-a may be preconfigured (e.g., prior to a connection with a cell) with the SSB configuration or a portion thereof.

The UE 115-a may support transmitting SRs 210 to request an uplink grant for an uplink transmission by the UE 115-a, for example, when data is available for uplink transmission (e.g., as triggered by some MAC functionality). For example, the UE 115-a may transmit an SR 210 to the network entity 105-a, and the network entity 105-a may transmit a message indicating an uplink grant 215 to the UE 115-a in response to the SR 210. In some cases, an SR 210 transmitted by the UE 115-a may be an example of a positive SR 210, which may request an uplink grant 215 from the network entity 105-a. In some cases, the UE 115-a may not transmit an SR request (e.g., may not include an SR indication in a physical uplink control channel (PUCCH) transmission during an SR transmission occasion), which may be referred to as a negative SR, and which may avoid requesting an uplink grant 215 from the network entity 105-a (e.g., in cases that the UE 115-a does not have uplink data to transmit, or if the UE 115-a already has one or more uplink grants 215 for transmitting uplink data, among other examples).

In some examples, the UE 115-a may refrain from transmitting an SR 210 if an SR transmission occasion occurs while a timer associated with monitoring for an uplink grant 215 from the network entity 105-a (e.g., sr-ProhibitTimer) is running. For example, the UE 115-a may be configured to start the timer (e.g., the sr-ProhibitTimer) after transmitting an SR 210. The UE 115-a may monitor for an uplink grant 215 from the network entity 105-a for a duration of the timer, and the UE 115-a may refrain from transmitting additional SRs 210 for the duration. The UE 115-a may also refrain from transmitting SRs 210 if the UE 115-a receives a downlink control message containing uplink resources, or if another timer (e.g., another sr-Prohibit timer) is running, among other examples.

In some cases, the UE 115-a may transmit SRs 210 in accordance with an SR configuration. The SR configuration may indicate one or more SR transmission occasions (e.g., by indicating a periodicity of SR transmissions), the duration of the timer (e.g., the sr-ProhibitTimer), and a parameter associated with a threshold (e.g., maximum) quantity of SRs 210 to be transmitted, among other parameters. In some examples, if the UE 115-*a* determines that the UE 115-*a* has transmitted a quantity of SRs 210 equal to the threshold (e.g., maximum) quantity of SRs 210 and the UE 115-*a* has not received an uplink grant 215, the UE 115-*a* may refrain from transmitting additional SRs 210 and may initiate random access procedures. To initiate the random access procedures, the UE 115-*a* may release uplink control resources and a sounding reference signal configuration, clear configured downlink assignments and uplink grants, and clear uplink data resources associated with transmitting semi-persistent channel state information, for example. The UE 115-*a* may (e.g., subsequently) perform random access procedures (e.g., RACH procedures) and obtain uplink control resources and one or more SR configurations from the network entity 105-*a*.

In some cases, operations of the wireless communications system 200 may be associated with relatively high energy usage or costs, and it may be desirable to employ techniques to reduce costs and improve energy savings. In one example, to help reduce energy consumption of the network entity 105-*a*, the network entity 105-*a* may enter a sleep mode for some period of time to reduce power consumption if the network entity 105-*a* does not expect to receive or transmit signaling for that period of time. However, the network entity 105-*a* may only enter the sleep mode as scheduling may allow. For instance, the network entity 105-*a* may be unable to enter a sleep mode if one or more SRs 210 are to be received from the UE 115-*a*. Therefore, it may be desirable for the network entity 105-*a* and the UE 115-*a* to coordinate timings of some communications, such as SRs 210, to allow for more periods of time for the network entity 105-*a* or the UE 115-*a* to enter sleep mode.

In accordance with examples as described herein, the UE 115-*a* may employ timer delay procedures after transmitting transmit an SR 210 to delay starting the timer (e.g., the sr-ProhibitTimer) until a time prior to a start of an SSB transmission occasion from the network entity 105-*a*. That is, the UE 115-*a* may start the timer at a time that is a first threshold duration prior to (e.g., a start of) a next SSB transmission occasion (e.g., determined by the UE 115-*a* in accordance with an SSB configuration). The UE 115-*a* may refrain from transmitting any SRs 210 during an SR transmission occasion that may be scheduled after the transmitted SR 210 and prior to the start of the timer. Further, the first threshold duration may be relatively larger or relatively smaller than a duration of the timer. In some examples, the UE 115-*a* may be configured with the first threshold duration (e.g., by the network entity 105-*a*). Additionally, or alternatively, the UE 115-*a* may receive an RRC message, a system information message (e.g., a system information block (SIB)), downlink control information (DCI), a MAC-control element (MAC-CE) message, or any combination thereof, that indicates the first threshold duration.

In some cases, the timer delay procedures may involve the UE 115-*a* delaying the timer (e.g., the sr-ProhibitTimer) associated with an SR 210 if the SR 210 is transmitted in accordance with a second threshold duration. For example, the UE 115-*a* may determine that an SR 210 is transmitted at a time that is after a second threshold duration following a previous (e.g., last, most recent) SSB transmission occasion, and the UE 115-*a* may delay the timer based on the determination. Meanwhile, if the UE 115-*a* determines that an SR 210 is transmitted at a time that is prior to the second threshold duration following the previous SSB transmission occasion, the UE 115-*a* may start the timer after (e.g., immediately after) transmitting the SR 210 (e.g., without delaying the start of the timer). Details regarding the first threshold duration and the second threshold duration are described with more detail herein with reference to FIG. 3.

In some examples, it may be desirable to enable timer delay procedures in conditions where some communication latency may be acceptable at the UE 115-*a*. Accordingly, the UE 115-*a* may be configured to enable and/or disable timer delay procedures (e.g., or portions thereof) as described herein. For example, the network entity 105-*a* may configure the UE 115-*a* with timer delay procedures via a RRC message, a MAC-CE message, DCI, or any combination thereof. In some cases, the UE 115-*a* may be configured with one or more SRs 210 for which to enable timer delay procedures. For example, the network entity 105-*a* may provide the UE 115-*a* with one or more identification values corresponding to one or more respective SRs 210 for which timer delay procedures are to be enabled.

In some cases, to further support flexibility in enabling the timer delay procedures, an SR configuration may include a field that may indicate, to the UE 115-*a*, whether to enable the timer delay procedures. For example, the SR configuration may include a field (e.g., a binary field, such as SchedulingRequestResourceConfig-TimerAlign) which may be set to a value that may enable or disable the timer delay procedures at the UE 115-*a* for SRs 210 corresponding to the SR configuration. In some cases, enabling the timer delay procedures for an SR 210 may be associated with a priority value associated with the SR 210 (e.g., included in the SR configuration).

Additionally, or alternatively, the timer delay procedures may be dynamically enabled or disabled at the UE 115-*a*. For example, the UE 115-*a* may transmit a request to enable timer delay procedures to the network entity 105-*a*. The network entity 105-*a* may receive the request from the UE 115-*a*, and the network entity 105-*a* may determine whether to enable or disable the timer delay procedures in response to the request (e.g., based on network conditions, type of traffic for communications to or from the UE 115-*a*, a quantity of traffic associated with the UE 115-*a*, or other conditions).

Accordingly, by delaying the start of the timer (e.g., the sr-ProhibitTimer), the UE 115-*a* and the network entity 105-*a* may improve scheduling coordination. For example, signaling exchanged between the UE 115-*a* and the network entity 105-*a* may be coordinated around times during which the network entity 105-*a* may already be in an active state (e.g., to transmit SSBs 205), which may enable the UE 115-*a* and the network entity 105-*a* to enter a sleep mode for relatively longer durations and therefore improve power savings and reduce costs associated therewith. Additionally, by configuring methods to enable or disable the timer delay procedures at the UE 115-*a*, latency that may be associated with delaying the start of the timer may be avoided during critical or high-traffic communication scenarios.

Figure 3:
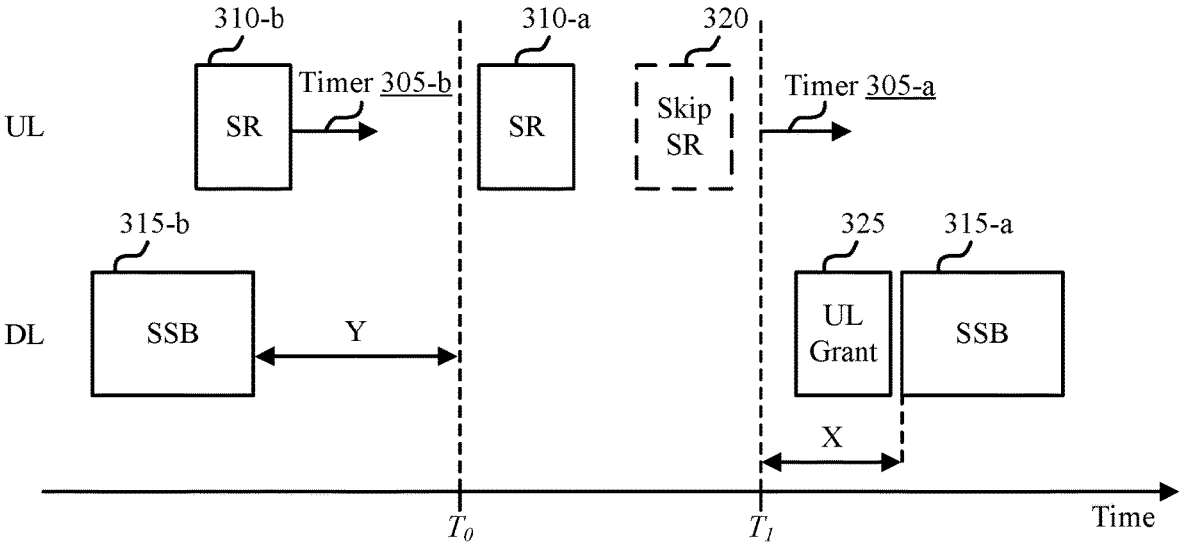
FIG. 3 illustrates an example of a signaling diagram that supports SR response monitoring alignment for energy savings in accordance with one or more aspects of the present disclosure.

FIG. 3 illustrates an example of a signaling diagram 300 that supports SR response monitoring alignment for energy savings in accordance with one or more aspects of the present disclosure. The signaling diagram 300 may implement aspects of the wireless communications system 100 and the wireless communications system 200, as described herein with reference to FIGS. 1 and 2. For example, the signaling diagram 300 illustrate example uplink (UL) and downlink (DL) transmissions, which may be examples of transmissions between a UE (e.g., a UE 115) and a network entity (e.g., a network entity 105), as described herein.

The signaling diagram 300 illustrates aspects of the timer delay procedures described herein with reference to FIG. 2. A UE may transmit an SR 310-*a* and delay the start of a timer 305-*a* (e.g., an sr-ProhibitTimer) associated with monitoring for an uplink grant 325 from a network entity. For example, the UE may start the timer 305-*a* at a time, $T_1$, that is a first threshold duration (e.g., X, as illustrated in FIG. 3) prior to (e.g., a start of) a subsequent SSB transmission occasion 315-*a* (e.g., a next SSB transmission occasion, which may be determined by the UE in accordance with an SSB configuration). The UE 115 may refrain from transmitting SRs 310 during an SR 310 transmission occasion that may be scheduled after the transmitted SR 310-*a* and prior to the start of the timer 305-*a*. For example, the UE may skip transmitting an SR 320 that may have been otherwise transmitted following the SR 310-*a* (e.g., had the timer been started after the SR 310-*b* was transmitted). The UE may start the timer 305-*a* at time $T_1$, and the UE 115 may monitor for (e.g., and detect) an uplink grant 325 during a duration of the timer 305-*a* (e.g., before the timer expires).

In some cases, the timer delay procedures may involve a UE delaying a timer associated with an SR 310 if the SR 310 is transmitted in accordance with a second threshold duration. For example, the UE may determine that the SR 310-*a* is transmitted at a time that is after a second threshold duration (e.g., Y as shown in FIG. 3) following a previous SSB transmission occasion 315-*b*, and the UE may delay the timer 305-*a* based on the determination. Additionally, the UE may determine that an SR 310-*b* is transmitted at a time that is prior to the second threshold duration elapsing following the previous SSB transmission occasion 315-*b*, and the UE may start a timer 305-*b* (e.g., the sr-Prohibit-Timer) after transmitting the SR 310-*b* (e.g., without delaying the start of the timer 305-*b*). That is, because the SR 310-*b* is transmitted prior to a time $T_0$ corresponding to the threshold duration (e.g., Y) after the SSB transmission occasion 315-*b*, the UE may start the time 305-*b* upon transmission of the SR 310-*b*.

In some examples, the UE may be configured with values for the first threshold duration (X), the second threshold duration (Y), or both, (e.g., by a network entity). For example, the UE may receive a RRC message, a system information message (e.g., an SIB), DCI, a MAC-CE message, or any combination thereof, that indicates a value for the first threshold duration, the second threshold duration, or both.

The UE may be configured with multiple logical channels (e.g., and groups of logical channels), and the UE may transmit an SR 310 if data is available for transmission corresponding to at least one of the logical channels. In some examples, the UE may be configured to select a set of values for the first threshold duration and the second threshold duration based on a quantity of the configured logical channels (e.g., or groups) for which data is available for transmission by the UE. For example, the UE may be configured with three logical channels and three sets of values for the first threshold duration and the second threshold duration (e.g., $(X_0, Y_0)$, $(X_1, Y_1)$, and $(X_2, Y_2)$). The UE may select a first set of values based on having data available for one of the configured logical channels, a second set of values based on having data available for two of the configured logical channels, and a third set of values based on having data available for three of the configured logical channels. The values corresponding to the sets of values may be configured to the UE by a network entity, for example, using a RRC message. Different quantities of sets of values corresponding to different quantities of logical channels for which data may be available are possible as well, in other examples.

The UE may be configured to enable or disable selecting a set of values for the first threshold duration and the second threshold duration based on the quantity of logical channels for which data is available for transmission by the UE. For example, a network entity may configure the UE to apply or disable selecting the set of values via a RRC message, a MAC-CE message, DCI, or any combination thereof. In some cases, the UE 115 may be configured to enable or disable selecting the set of values for a specific SR 310 (e.g., SR 310-*a*, SR 310-*b*). For example, the network entity may provide the UE with one or more identification values corresponding to one or more respective SRs 310 for which sets of values for the first threshold duration and the second threshold duration are to be selected based on a quantity of logical channels for which data is available at the UE.

In some examples, the UE may select the values for the first threshold duration, the second threshold duration, or both based on priority values associated with a channel (e.g., for transmission of an SR 310). For example, the UE may receive a configuration (e.g., a SchedulingRequestRe-sourceConfig) indicating a priority value (e.g., an index, phy-PriorityIndex) associated with an SR 310 resource (e.g., for transmission of an SR 310), and the UE may select values for the first threshold duration, the second threshold duration, or both, based on the priority value associated with the SR 310. In some examples, the priority value may be a binary value which may indicate either a high priority (e.g., with a value of 1) or a low priority (e.g., with a value of 0). In these examples, the UE may select a first set of values for the first threshold duration the second threshold duration (e.g., from configured or preconfigured values) based on the SR 310 being associated with a high priority, or the UE may select a second set of values for the first threshold duration and the second threshold duration based on the SR 310 being associated with a low priority.

Accordingly, by delaying the start of the timer 305-*a*, the UE and the network entity may improve scheduling coordination. For example, signaling exchanged between the UE and the network entity may be coordinated around times during which the network entity may already be in an active state (e.g., to transmit SSBs), which may enable the UE and the network entity to enter a sleep mode (e.g., after SR 310-*a* and prior to the start of the timer 305-*a*) and therefore improve power savings and reduce costs associated therewith. Additionally, values for the first threshold duration and the second threshold duration may be selected or configured for different transmission scenarios, as described herein.

Figure 4:
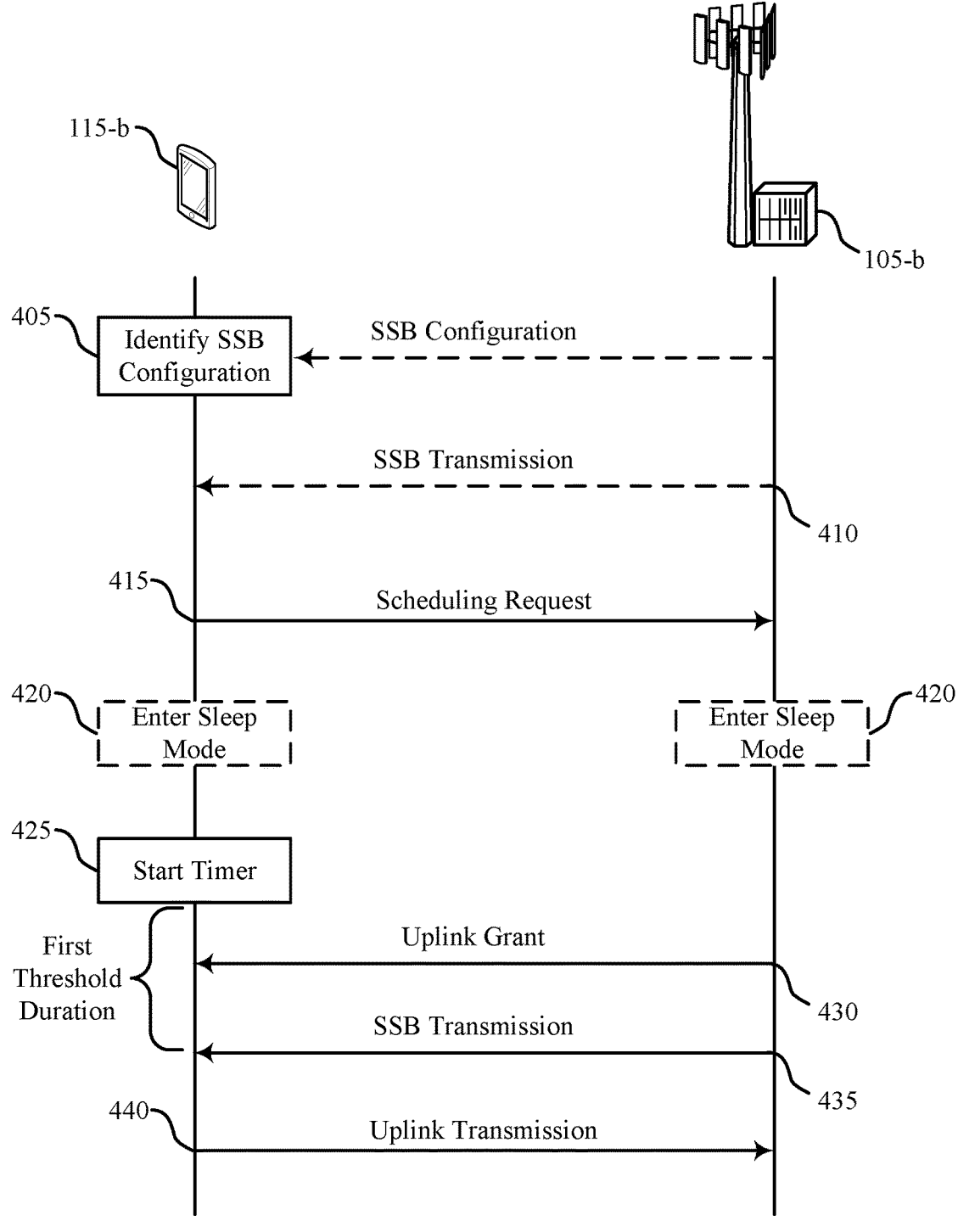
FIG. 4 illustrates an example of a process flow that supports SR response monitoring alignment for energy savings in accordance with one or more aspects of the present disclosure.

FIG. 4 illustrates an example of a process flow 400 that supports SR response monitoring alignment for energy savings in accordance with one or more aspects of the present disclosure. The process flow 400 may implement aspects of the wireless communications system 100, the wireless communications system 200, and the signaling diagram 300, as described herein with reference to FIGS. 1 through 3. For example, the process flow 400 illustrate example transmissions between a UE 115-*b* and a network entity 105-*b*, which may be examples of corresponding devices as described herein. In the following descriptions of the process flow 400, the operations performed by the devices may be performed in different orders or at different times. Additionally, or alternatively, some operations may be omitted from the process flow 400, and other operations may be added to the process flow 400.

At 405, the UE 115-*b* may identify an SSB configuration for receiving one or more SSBs from the network entity 105-*b*. In some examples, the SSB configuration may indicate a plurality of SSB transmission occasions for reception of an SSB by the UE 115-*b* from the network entity 105-*b*. In some cases, identifying the SSB configuration may involve receiving a message indicating the SSB configuration (e.g., or a portion thereof) from the network entity 105-*b* or another device. In some cases, the UE 115-*b* may be configured with the SSB configuration when the UE 115-*b* is configured (e.g., by the network entity 105-*b* or another device) with a cell (e.g., a secondary cell, a primary cell, or both) or a cell group (e.g., an additional or secondary cell group). Additionally, or alternatively, the UE 115-*a* may be preconfigured (e.g., prior to a connection with a cell) with the SSB configuration or a portion thereof.

At 410, the network entity 105-*b* may transmit an SSB message to the UE 115-*b*. The SSB message may be transmitted in a transmission occasion in accordance with the SSB configuration identified by the UE 115-*b*.

At 415, the UE 115-*b* may transmit an SR to the network entity 105-*b*. The SR may request an uplink grant from the network entity 105-*b* for an uplink transmission by the UE 115-*b*. In some examples, the UE 115-*a* may determine that the SR was transmitted at a second time that satisfies a second threshold duration after the (e.g., last) SSB message transmitted to the UE 115-*b*.

At 420, the UE 115-*b*, the network entity 105-*b*, or both, may enter a sleep mode based on delaying a start of a timer associated with the SR transmission.

At 425, the UE 115-*b* may start a timer associated with monitoring for the uplink grant from the network entity 105-*b*. The timer may be started at a first time that satisfies a first threshold duration prior to a next SSB transmission occasion, which may be determined by the UE 115-*b* based on the SSB configuration.

At 430, the network entity 105-*b* may transmit the uplink grant to the UE 115-*b*. The UE 115-*b* may monitor for the uplink grant during a duration of the timer and detect the uplink grant. At 435, the network entity 105-*b* may transmit an SSB message to the UE 115-*b*.

At 440, the UE 115-*b* may transmit the uplink transmission. For example, the UE 115-*b* may transmit the uplink transmission during an occasion (e.g., resource) indicated by the uplink grant.

Accordingly, by delaying the start of the timer associated with monitoring for the uplink grant, the UE 115-*b* and the network entity 105-*b* may improve scheduling coordination. For example, signaling exchanged between the UE 115-*b* and the network entity 105-*b* may be coordinated around times during which the network entity 105-*b* may already be in an active state (e.g., to transmit SSB messages), which may enable the UE 115-*b* and the network entity 105-*b* to enter a sleep mode and therefore improve power savings and reduce costs associated therewith.

Figure 5:
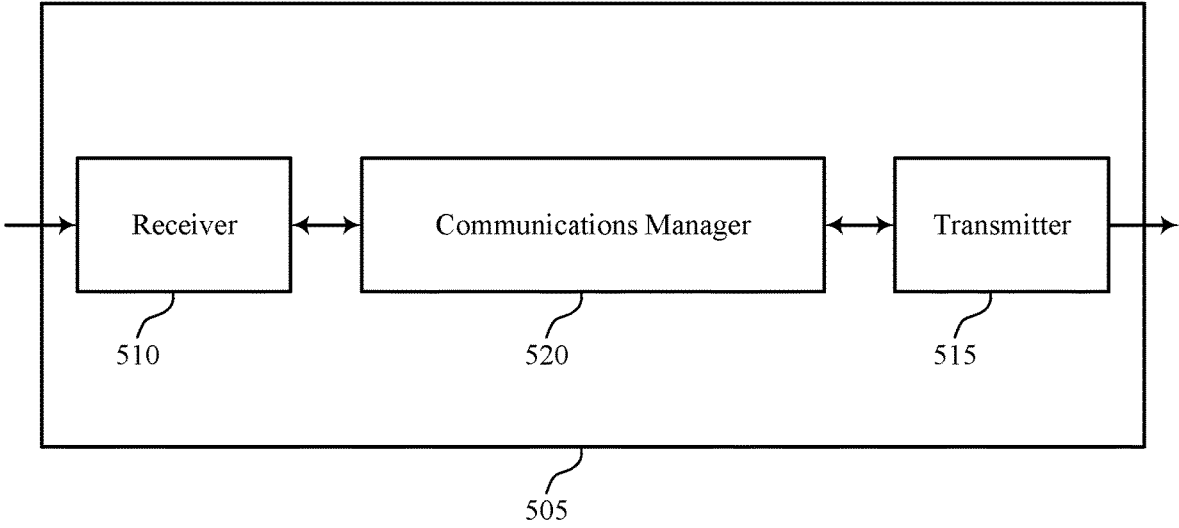
FIGS. 5 and 6 illustrate block diagrams of devices that support SR response monitoring alignment for energy savings in accordance with one or more aspects of the present disclosure.

FIG. 5 illustrates a block diagram 500 of a device 505 that supports SR response monitoring alignment for energy savings in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to SR response monitoring alignment for energy savings). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to SR response monitoring alignment for energy savings). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of SR response monitoring alignment for energy savings as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager

520 may be configured as or otherwise support a means for identifying an SSB timing for receiving one or more SSBs from a network entity in accordance with periodic SSB transmission occasions. The communications manager 520 may be configured as or otherwise support a means for transmitting, to the network entity, a first SR that requests an uplink grant for an uplink transmission by the UE. The communications manager 520 may be configured as or otherwise support a means for starting a timer associated with monitoring for the uplink grant from the network entity based on transmitting the first SR, where the timer is started after the first SR is transmitted and at a first time satisfying a first threshold duration prior to a first SSB transmission occasion of the periodic SSB transmission occasions.

By including or configuring the communications manager 520 in accordance with examples as described herein, the device 505 (e.g., a processor controlling or otherwise coupled with the receiver 510, the transmitter 515, the communications manager 520, or any combination thereof) may support techniques for SR response monitoring alignment that may reduce power consumption and cost associated with power usage.

Figure 6:
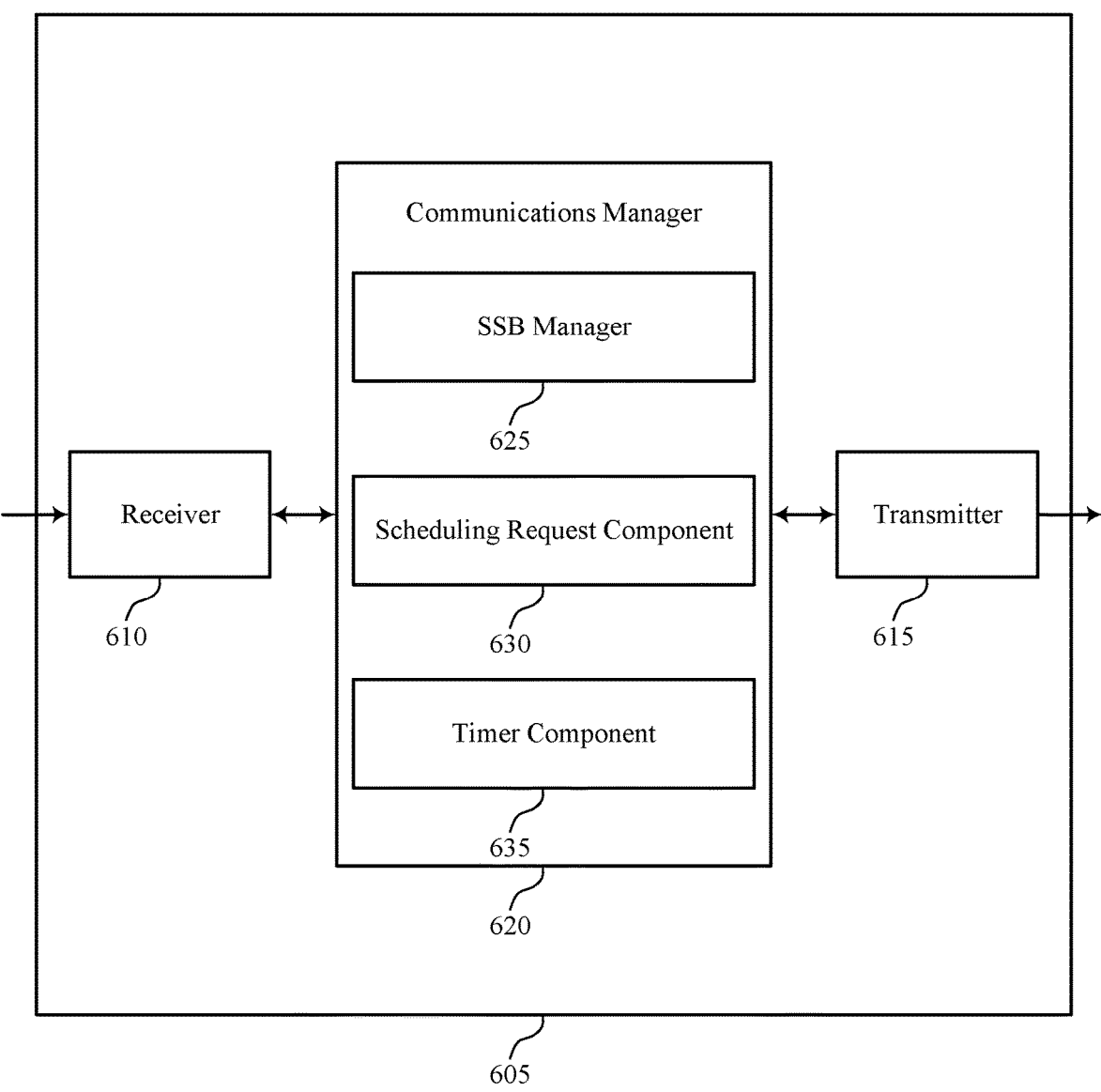

FIG. 6 illustrates a block diagram 600 of a device 605 that supports SR response monitoring alignment for energy savings in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor (not shown). Each of these components may be in communication with one another (e.g., via one or more buses).

The receiver 610 may provide a means for receiving information such as packets, user data, control information, or any combination thereof associated with various information channels (e.g., control channels, data channels, information channels related to SR response monitoring alignment for energy savings). Information may be passed on to other components of the device 605. The receiver 610 may utilize a single antenna or a set of multiple antennas (not shown).

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to SR response monitoring alignment for energy savings). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of SR response monitoring alignment for energy savings as described herein. For example, the communications manager 620 may include an SSB manager 625, a SR component 630, a timer component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The SSB manager 625 may be configured as or otherwise support a means for identifying an SSB timing for receiving one or more SSBs from a network entity in accordance with periodic SSB transmission occasions. The SR component 630 may be configured as or otherwise support a means for transmitting, to the network entity, a first SR that requests an uplink grant for an uplink transmission by the UE. The timer component 635 may be configured as or otherwise support a means for starting a timer associated with monitoring for the uplink grant from the network entity based on transmitting the first SR, where the timer is started after the first SR is transmitted and at a first time satisfying a first threshold duration prior to a first SSB transmission occasion of the periodic SSB transmission occasions.

Figure 7:
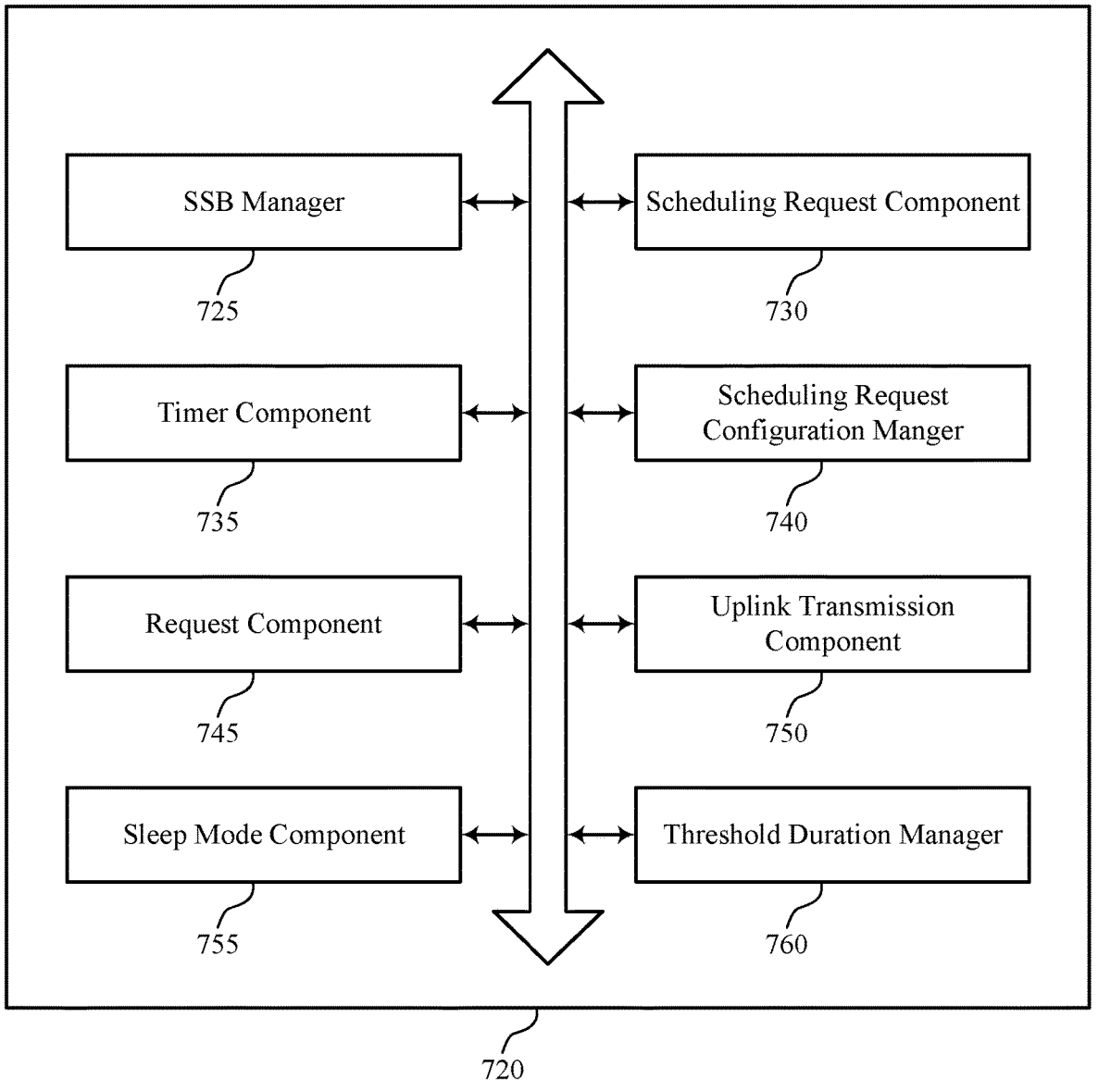
FIG. 7 illustrates a block diagram of a communications manager that supports SR response monitoring alignment for energy savings in accordance with one or more aspects of the present disclosure.

FIG. 7 illustrates a block diagram 700 of a communications manager 720 that supports SR response monitoring alignment for energy savings in accordance with one or more aspects of the present disclosure. The communications manager 720 may be an example of aspects of a communications manager 520, a communications manager 620, or both, as described herein. The communications manager 720, or various components thereof, may be an example of means for performing various aspects of SR response monitoring alignment for energy savings as described herein. For example, the communications manager 720 may include an SSB manager 725, a SR component 730, a timer component 735, a SR configuration manager 740, a request component 745, an uplink transmission component 750, a sleep mode component 755, a threshold duration manager 760, or any combination thereof. Each of these components may communicate, directly or indirectly, with one another (e.g., via one or more buses).

The communications manager 720 may support wireless communication at a UE in accordance with examples as disclosed herein. The SSB manager 725 may be configured as or otherwise support a means for identifying an SSB timing for receiving one or more SSBs from a network entity in accordance with periodic SSB transmission occasions. The SR component 730 may be configured as or otherwise support a means for transmitting, to the network entity, a first SR that requests an uplink grant for an uplink transmission by the UE. The timer component 735 may be configured as or otherwise support a means for starting a timer associated with monitoring for the uplink grant from the network entity based on transmitting the first SR, where the timer is started after the first SR is transmitted and at a first time satisfying a first threshold duration prior to a first SSB transmission occasion of the periodic SSB transmission occasions.

In some examples, the timer component 735 may be configured as or otherwise support a means for determining that the first SR is transmitted at a second time that satisfies a second threshold duration after a second SSB transmission occasion of the periodic SSB transmission occasions, the second SSB transmission occasion preceding the first SSB transmission occasion, where the timer is started based on transmitting the first SR at the second time.

In some examples, the threshold duration manager 760 may be configured as or otherwise support a means for selecting a first value for the first threshold duration or a second value for the second threshold duration, or both, based on a quantity of one or more logical channels for which data is available for transmission by the UE.

In some examples, the threshold duration manager 760 may be configured as or otherwise support a means for receiving a first control message indicating a configuration of the first value or the second value, or both, where selecting the first value or the second value, or both, is based on the configuration.

In some examples, the threshold duration manager 760 may be configured as or otherwise support a means for receiving a second control message indicating whether the UE is to select the first value, the second value, or both based on the quantity of the one or more logical channels, where selecting the first value or the second value, or both, is based on the second control message.

In some examples, the second control message includes a RRC message, a MAC-CE, or DCI.

In some examples, the threshold duration manager 760 may be configured as or otherwise support a means for receiving a message including an indication of the first threshold duration, the second threshold duration, or both, where the timer is started based on the indication.

In some examples, the message includes a RRC message, a system information message, DCI, or a medium access control message, or any combination thereof.

In some examples, the SR configuration manager 740 may be configured as or otherwise support a means for receiving a SR configuration that includes a field indicating whether the timer is to be started at a time that satisfies the first threshold duration prior to an SSB transmission occasion of the periodic SSB transmission occasions, where starting the timer is based on the field of the SR configuration.

In some examples, the request component 745 may be configured as or otherwise support a means for transmitting a request associated with starting the timer prior to the first SSB transmission occasion. In some examples, the request component 745 may be configured as or otherwise support a means for receiving, in response to the request, a message indicating that the timer is to be started at the first time based on the request.

In some examples, the uplink transmission component 750 may be configured as or otherwise support a means for monitoring for the uplink grant for a duration of the timer based on starting the timer. In some examples, the uplink transmission component 750 may be configured as or otherwise support a means for transmitting the uplink transmission based on receiving the uplink grant during the duration of the timer.

In some examples, the uplink transmission component 750 may be configured as or otherwise support a means for monitoring for the uplink grant during a duration of the timer based on starting the timer. In some examples, the uplink transmission component 750 may be configured as or otherwise support a means for transmitting a second SR based on failing to receive the uplink grant during the duration of the timer.

In some examples, the sleep mode component 755 may be configured as or otherwise support a means for entering a sleep mode after transmitting the first SR. In some examples, the sleep mode component 755 may be configured as or otherwise support a means for exiting the sleep mode prior to starting the timer.

In some examples, the SR component 730 may be configured as or otherwise support a means for refraining from transmitting one or more additional SRs until the timer expires.

Figure 8:
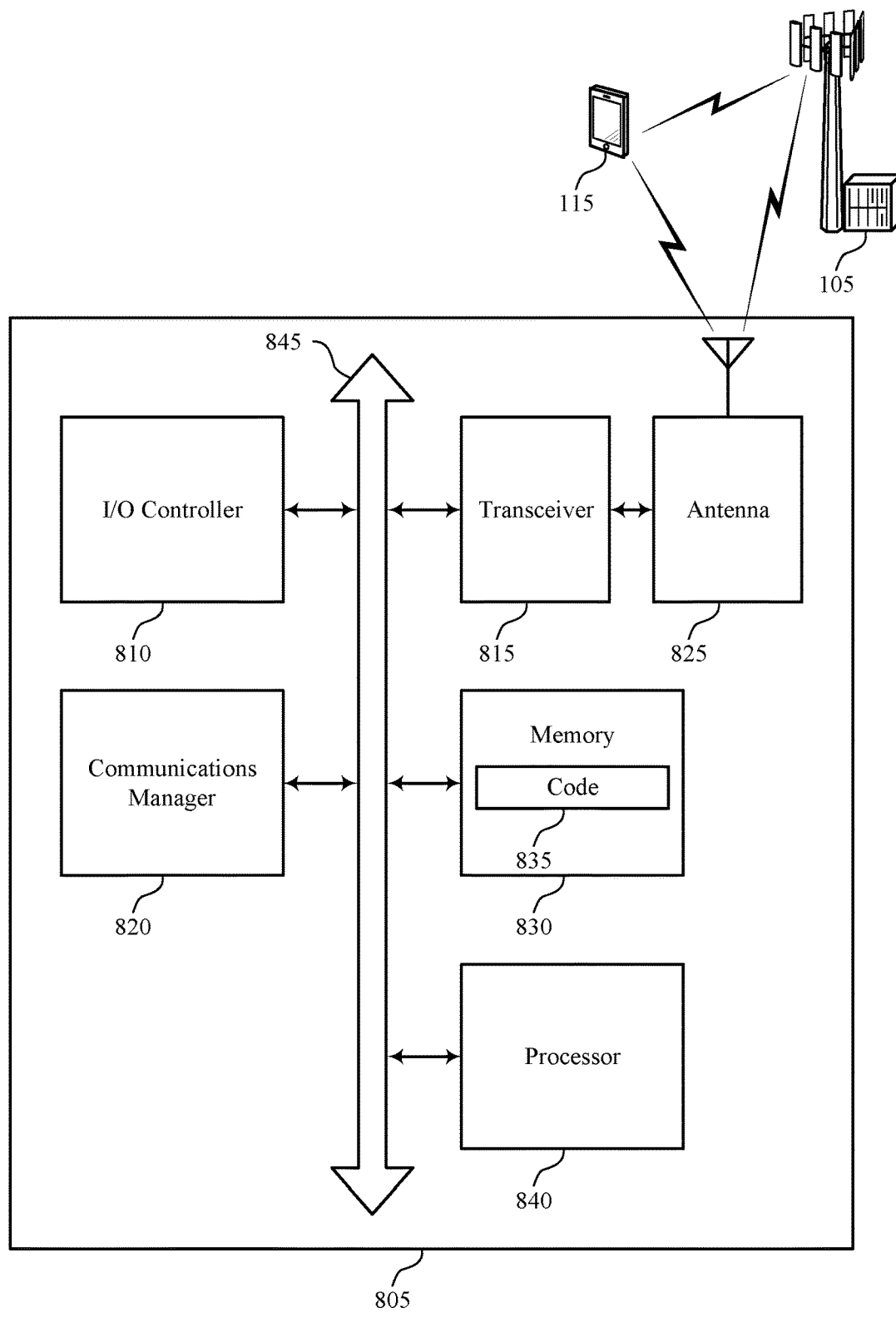
FIG. 8 illustrates a diagram of a system including a device that supports SR response monitoring alignment for energy savings in accordance with one or more aspects of the present disclosure.

FIG. 8 illustrates a diagram of a system 800 including a device 805 that supports SR response monitoring alignment for energy savings in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting SR response monitoring alignment for energy savings). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for identifying an SSB timing for receiving one or more SSBs from a network entity in accordance with periodic SSB transmission occasions. The communications manager 820 may be configured as or otherwise support a means for transmitting, to the network entity, a first SR that requests an uplink grant for an uplink transmission by the UE. The communications manager 820 may be configured as or otherwise support a means for starting a timer associated with monitoring for the uplink grant from the network entity based on transmitting the first SR, where the timer is started after the first SR is transmitted and at a first time satisfying a first threshold duration prior to a first SSB transmission occasion of the periodic SSB transmission occasions.

By including or configuring the communications manager 820 in accordance with examples as described herein, the device 805 may support techniques for SR response monitoring alignment that may reduce power consumption and cost associated with power usage, leading to more efficient utilization of communication resources and longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described herein with reference to the communications manager 820 may be supported by or performed by the processor 840, the memory 830, the code 835, or any combination thereof. For example, the code 835 may include instructions executable by the processor 840 to cause the device 805 to perform various aspects of SR response monitoring alignment for energy savings as described herein, or the processor 840 and the memory 830 may be otherwise configured to perform or support such operations.

Figure 9:
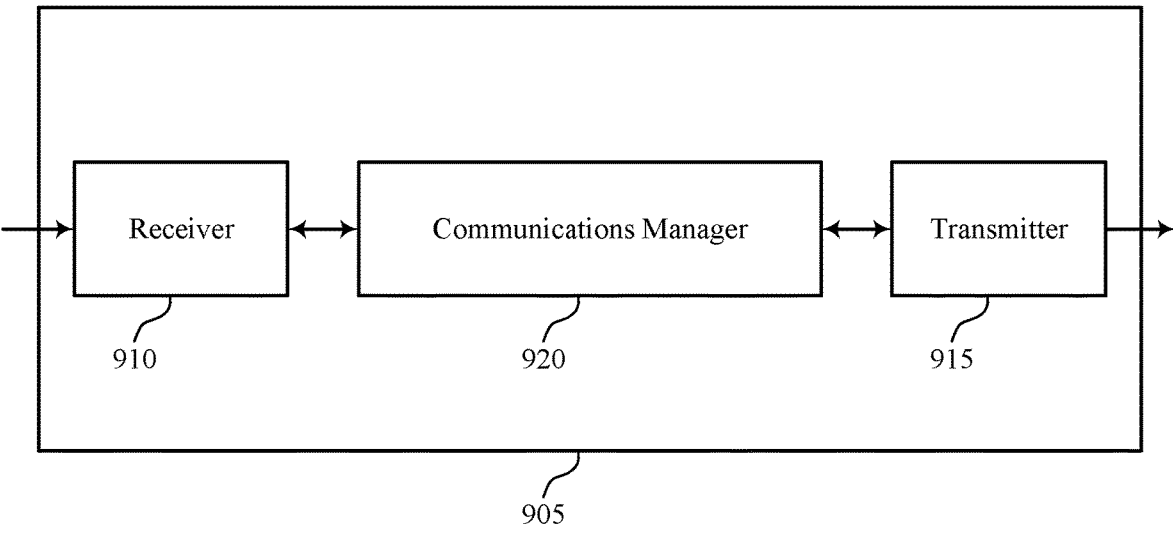
FIGS. 9 and 10 illustrate block diagrams of devices that support SR response monitoring alignment for energy savings in accordance with one or more aspects of the present disclosure.

FIG. 9 illustrates a block diagram 900 of a device 905 that supports SR response monitoring alignment for energy savings in accordance with one or more aspects of the present disclosure. The device 905 may be an example of aspects of a network entity 105 as described herein. The device 905 may include a receiver 910, a transmitter 915, and a communications manager 920. The device 905 may also include a processor (not shown). Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas (not shown). Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of SR response monitoring alignment for energy savings as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 may be configured as or otherwise support a means for identifying an SSB timing for transmitting one or more SSBs to a UE in accordance with periodic SSB transmission occasions. The communications manager 920 may be configured as or otherwise support a means for receiving, from the UE, a SR that requests an uplink grant for an uplink transmission by the UE. The communications manager 920 may be configured as or otherwise support a means for transmitting, to the UE and based on receiving the SR, the uplink grant during a duration of a timer, where the timer is started at a first time satisfying a first threshold duration prior to a start of a first SSB transmission occasion of the periodic SSB transmission occasions.

By including or configuring the communications manager 920 in accordance with examples as described herein, the device 905 (e.g., a processor controlling or otherwise coupled with the receiver 910, the transmitter 915, the communications manager 920, or any combination thereof) may support techniques for SR response monitoring alignment that may reduce power consumption and cost associated with power usage. As a result, the device 905 may support enhanced network energy efficiency.

Figure 10:
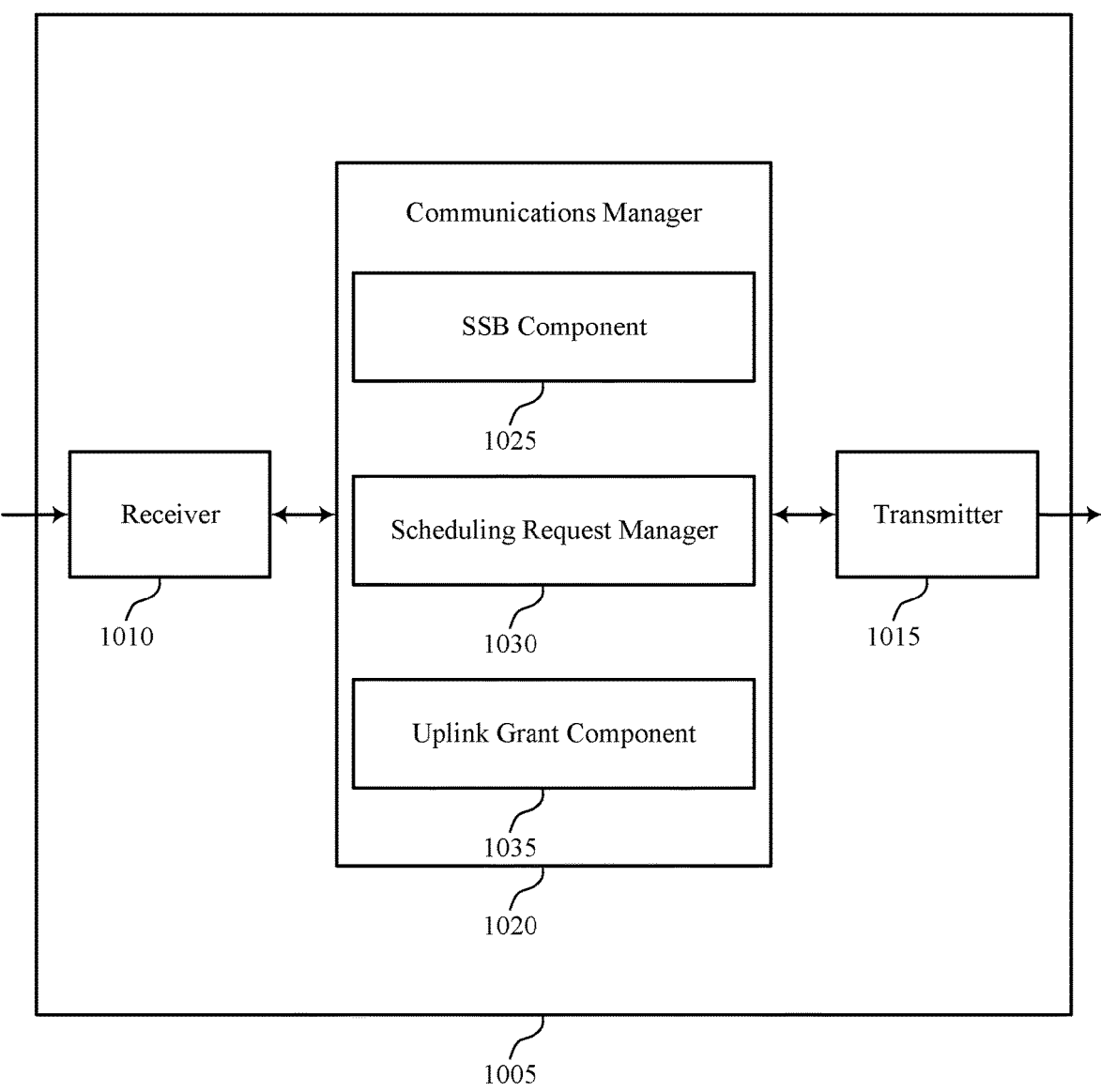

FIG. 10 illustrates a block diagram 1000 of a device 1005 that supports SR response monitoring alignment for energy savings in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of SR response monitoring alignment for energy savings as described herein. For example, the communications manager 1020 may include an SSB component 1025, a SR manager 1030, an uplink grant component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The SSB component 1025 may be configured as or otherwise support a means for identifying an SSB timing for transmitting one or more SSBs to a UE in accordance with periodic SSB transmission occasions. The SR manager 1030 may be configured as or otherwise support a means for receiving, from the UE, a SR that requests an uplink grant for an uplink transmission by the UE. The uplink grant component 1035 may be configured as or otherwise support a means for transmitting, to the UE and based on receiving the SR, the uplink grant during a duration of a timer, where the timer is started at a first time satisfying a first threshold duration prior to a start of a first SSB transmission occasion of the periodic SSB transmission occasions.

Figure 11:
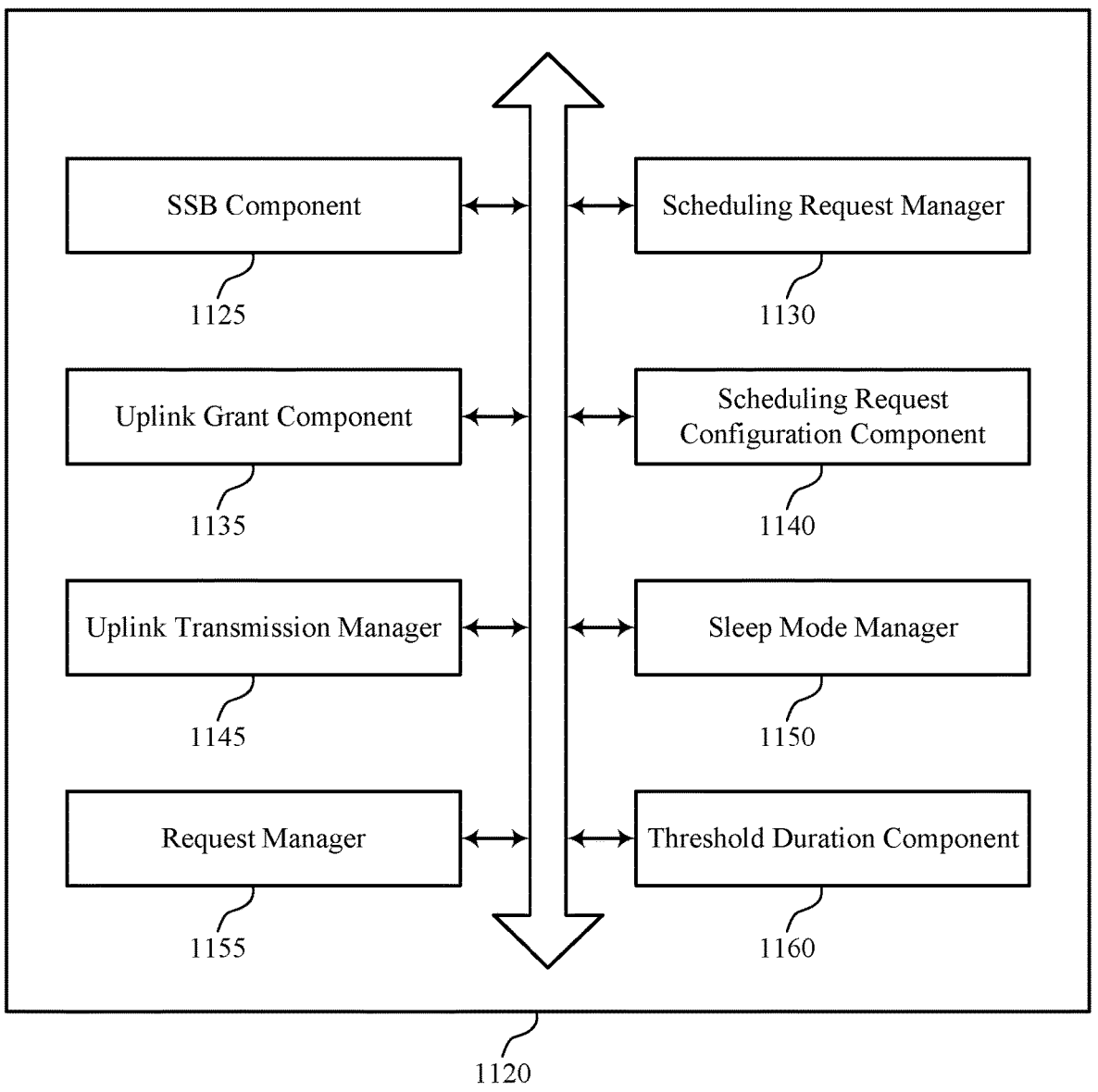
FIG. 11 illustrates a block diagram of a communications manager that supports SR response monitoring alignment for energy savings in accordance with one or more aspects of the present disclosure.

FIG. 11 illustrates a block diagram 1100 of a communications manager 1120 that supports SR response monitoring alignment for energy savings in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of SR response monitoring alignment for energy savings as described herein. For example, the communications manager 1120 may include an SSB component 1125, a SR manager 1130, an uplink grant component 1135, a SR configuration component 1140, an uplink transmission manager 1145, a sleep mode manager 1150, a request manager 1155, a threshold duration component 1160, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The SSB component 1125 may be configured as or otherwise support a means for identifying an SSB timing for transmitting one or more SSBs to a UE in accordance with periodic SSB transmission occasions. The SR manager 1130 may be configured as or otherwise support a means for receiving, from the UE, a SR that requests an uplink grant for an uplink transmission by the UE. The uplink grant component 1135 may be configured as or otherwise support a means for transmitting, to the UE and based on receiving the SR, the uplink grant during a duration of a timer, where the timer is started at a first time satisfying a first threshold duration prior to a start of a first SSB transmission occasion of the periodic SSB transmission occasions.

In some examples, the SR is received at a second time that satisfies a second threshold duration after a second SSB transmission occasion of the periodic SSB transmission occasions, the second SSB transmission occasion preceding the first SSB transmission occasion.

In some examples, the threshold duration component 1160 may be configured as or otherwise support a means for transmitting, to the UE, a first control message indicating a configuration associated with selecting a first value for the first threshold duration, a second value for the second threshold duration, or both, based on a quantity of one or more logical channels for which data is available for transmission by the UE.

In some examples, the threshold duration component 1160 may be configured as or otherwise support a means for transmitting, to the UE, a second control message indicating whether the UE is to select the first value, the second value, or both based on the quantity of one or more logical channels.

In some examples, the second control message includes a RRC message, a MAC-CE, or DCI.

In some examples, the threshold duration component 1160 may be configured as or otherwise support a means for transmitting a message including an indication of the first threshold duration, the second threshold duration, or both, where the timer is started based on the indication.

In some examples, the message includes a RRC message, a system information message, DCI, or a medium access control message, or any combination thereof.

In some examples, the SR configuration component 1140 may be configured as or otherwise support a means for transmitting, to the UE, a SR configuration that includes a field indicating whether the timer is to be started at a time that satisfies the first threshold duration prior to an SSB transmission occasion of the periodic SSB transmission occasions.

In some examples, the uplink transmission manager 1145 may be configured as or otherwise support a means for receiving the uplink transmission based on transmitting the uplink grant during the duration of the timer.

In some examples, the sleep mode manager 1150 may be configured as or otherwise support a means for entering a sleep mode after receiving the SR. In some examples, the sleep mode manager 1150 may be configured as or otherwise support a means for exiting the sleep mode prior to transmitting the uplink grant.

In some examples, the request manager 1155 may be configured as or otherwise support a means for receiving a request associated with starting the timer prior to the first SSB transmission occasion. In some examples, the request manager 1155 may be configured as or otherwise support a means for transmitting, in response to the request, a message indicating that the timer is to be started at the first time based on the request.

Figure 12:
FIG. 12 illustrates a diagram of a system including a device that supports SR response monitoring alignment for energy savings in accordance with one or more aspects of the present disclosure.

FIG. 12 illustrates a diagram of a system 1200 including a device 1205 that supports SR response monitoring alignment for energy savings in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or any combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting SR response monitoring alignment for energy savings). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system.

A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 may be configured as or otherwise support a means for identifying an SSB timing for transmitting one or more SSBs to a UE in accordance with periodic SSB transmission occasions. The communications manager 1220 may be configured as or otherwise support a means for receiving, from the UE, a SR that requests an uplink grant for an uplink transmission by the UE. The communications manager 1220 may be configured as or otherwise support a means for transmitting, to the UE and based on receiving the SR, the uplink grant during a duration of a timer, where the timer is started at a first time satisfying a first threshold duration prior to a start of a first SSB transmission occasion of the periodic SSB transmission occasions.

By including or configuring the communications manager 1220 in accordance with examples as described herein, the device 1205 may support techniques for SR response monitoring alignment that may reduce power consumption and cost associated with power usage, leading to more efficient utilization of communication resources and longer battery life.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described herein with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of SR response monitoring alignment for energy savings as described herein, or the processor 1235 and the memory 1225 may be otherwise configured to perform or support such operations.

FIG. 13 illustrates a flowchart showing a method 1300 that supports SR response monitoring alignment for energy savings in accordance with one or more aspects of the present disclosure. The operations of the method 1300 may be implemented by a UE or its components as described herein. For example, the operations of the method 1300 may be performed by a UE 115 as described herein with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include identifying an SSB timing for receiving one or more SSBs from a network entity in accordance with periodic SSB transmission occasions. The operations of 1305 may be performed in accordance with examples as disclosed herein. In some examples, aspects of the operations of 1305 may be performed by an SSB manager 725 as described herein with reference to FIG. 7.

At 1310, the method may include transmitting, to the network entity, a first SR that requests an uplink grant for an uplink transmission by the UE. The operations of 1310 may be performed in accordance with examples as disclosed herein. In some examples, aspects of the operations of 1310 may be performed by a SR component 730 as described herein with reference to FIG. 7.

At 1315, the method may include starting a timer associated with monitoring for the uplink grant from the network entity based on transmitting the first SR, where the timer is started after the first SR is transmitted and at a first time satisfying a first threshold duration prior to a first SSB transmission occasion of the periodic SSB transmission occasions. The operations of 1315 may be performed in accordance with examples as disclosed herein. In some examples, aspects of the operations of 1315 may be performed by a timer component 735 as described herein with reference to FIG. 7.

FIG. 14 illustrates a flowchart showing a method 1400 that supports SR response monitoring alignment for energy savings in accordance with one or more aspects of the present disclosure. The operations of the method 1400 may be implemented by a UE or its components as described herein. For example, the operations of the method 1400 may be performed by a UE 115 as described herein with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include identifying an SSB timing for receiving one or more SSBs from a network entity in accordance with periodic SSB transmission occasions. The operations of 1405 may be performed in accordance with examples as disclosed herein. In some examples, aspects of the operations of 1405 may be performed by an SSB manager 725 as described herein with reference to FIG. 7.

At 1410, the method may include transmitting, to the network entity, a first SR that requests an uplink grant for an uplink transmission by the UE. The operations of 1410 may be performed in accordance with examples as disclosed herein. In some examples, aspects of the operations of 1410 may be performed by a SR component 730 as described herein with reference to FIG. 7.

At 1415, the method may include determining that the first SR is transmitted at a second time that satisfies a second threshold duration after a second SSB transmission occasion of the periodic SSB transmission occasions, the second SSB transmission occasion preceding the first SSB transmission occasion. The operations of 1415 may be performed in accordance with examples as disclosed herein. In some examples, aspects of the operations of 1415 may be performed by a timer component 735 as described herein with reference to FIG. 7.

At 1420, the method may include starting a timer associated with monitoring for the uplink grant from the network entity based on transmitting the first SR, where the timer is started after the first SR is transmitted and at a first time satisfying a first threshold duration prior to a first SSB transmission occasion of the periodic SSB transmission occasions, and where the timer is started based on transmitting the first SR at the second time. The operations of 1420 may be performed in accordance with examples as disclosed herein. In some examples, aspects of the operations of 1420 may be performed by a timer component 735 as described herein with reference to FIG. 7.

FIG. 15 illustrates a flowchart showing a method 1500 that supports SR response monitoring alignment for energy savings in accordance with one or more aspects of the present disclosure. The operations of the method 1500 may be implemented by a network entity or its components as described herein. For example, the operations of the method 1500 may be performed by a network entity as described herein with reference to FIGS. 1 through 3 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include identifying an SSB timing for transmitting one or more SSBs to a UE in accordance with periodic SSB transmission occasions. The operations of 1505 may be performed in accordance with examples as disclosed herein. In some examples, aspects of the operations of 1505 may be performed by an SSB component 1125 as described herein with reference to FIG. 11.

At 1510, the method may include receiving, from the UE, a SR that requests an uplink grant for an uplink transmission by the UE. The operations of 1510 may be performed in accordance with examples as disclosed herein. In some examples, aspects of the operations of 1510 may be performed by a SR manager 1130 as described herein with reference to FIG. 11.

At 1515, the method may include transmitting, to the UE and based on receiving the SR, the uplink grant during a duration of a timer, where the timer is started at a first time satisfying a first threshold duration prior to a start of a first SSB transmission occasion of the periodic SSB transmission occasions. The operations of 1515 may be performed in accordance with examples as disclosed herein. In some examples, aspects of the operations of 1515 may be performed by an uplink grant component 1135 as described herein with reference to FIG. 11.

Figure 16:
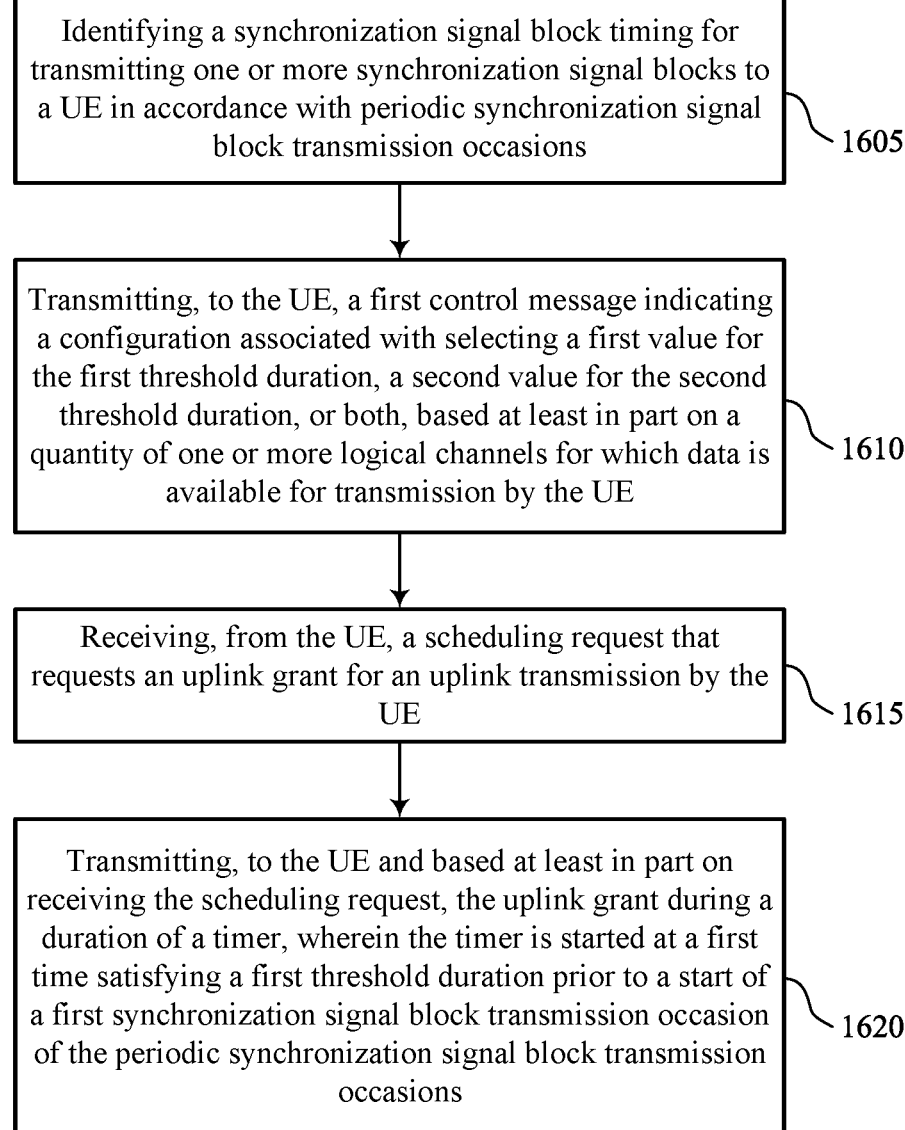

FIG. 16 illustrates a flowchart showing a method 1600 that supports SR response monitoring alignment for energy savings in accordance with one or more aspects of the present disclosure. The operations of the method 1600 may be implemented by a network entity or its components as described herein. For example, the operations of the method 1600 may be performed by a network entity as described herein with reference to FIGS. 1 through 3 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include identifying an SSB timing for transmitting one or more SSBs to a UE in accordance with periodic SSB transmission occasions. The operations of 1605 may be performed in accordance with examples as disclosed herein. In some examples, aspects of the operations of 1605 may be performed by an SSB component 1125 as described herein with reference to FIG. 11.

At 1610, the method may include transmitting, to the UE, a first control message indicating a configuration associated with selecting a first value for the first threshold duration, a second value for the second threshold duration, or both, based on a quantity of one or more logical channels for which data is available for transmission by the UE. The operations of 1610 may be performed in accordance with examples as disclosed herein. In some examples, aspects of the operations of 1610 may be performed by a threshold duration component 1160 as described herein with reference to FIG. 11.

At 1615, the method may include receiving, from the UE, a SR that requests an uplink grant for an uplink transmission by the UE. The operations of 1615 may be performed in accordance with examples as disclosed herein. In some examples, aspects of the operations of 1615 may be performed by a SR manager 1130 as described herein with reference to FIG. 11.

At 1620, the method may include transmitting, to the UE and based on receiving the SR, the uplink grant during a duration of a timer, where the timer is started at a first time satisfying a first threshold duration prior to a start of a first SSB transmission occasion of the periodic SSB transmission occasions. The operations of 1620 may be performed in accordance with examples as disclosed herein. In some examples, aspects of the operations of 1620 may be performed by an uplink grant component 1135 as described herein with reference to FIG. 11.

The following provides an overview of aspects of the present disclosure:

Aspect 1: A method for wireless communication at a UE, comprising: identifying an SSB timing for receiving one or more SSBs from a network entity in accordance with periodic SSB transmission occasions; transmitting, to the network entity, a first SR that requests an uplink grant for an uplink transmission by the UE; and starting a timer associated with monitoring for the uplink grant from the network entity based at least in part on transmitting the first SR, wherein the timer is started after the first SR is transmitted and at a first time satisfying a first threshold duration prior to a first SSB transmission occasion of the periodic SSB transmission occasions.

Aspect 2: The method of aspect 1, further comprising: determining that the first SR is transmitted at a second time that satisfies a second threshold duration after a second SSB transmission occasion of the periodic SSB transmission occasions, the second SSB transmission occasion preceding the first SSB transmission occasion, wherein the timer is started based at least in part on transmitting the first SR at the second time.

Aspect 3: The method of aspect 2, further comprising: selecting a first value for the first threshold duration or a second value for the second threshold duration, or both, based at least in part on a quantity of one or more logical channels for which data is available for transmission by the UE.

Aspect 4: The method of aspect 3, further comprising: receiving a first control message indicating a configuration of the first value or the second value, or both, wherein selecting the first value or the second value, or both, is based at least in part on the configuration.

Aspect 5: The method of aspect 4, further comprising: receiving a second control message indicating whether the UE is to select the first value, the second value, or both based at least in part on the quantity of the one or more logical channels, wherein selecting the first value or the second value, or both, is based at least in part on the second control message.

Aspect 6: The method of aspect 5, wherein the second control message comprises a radio resource control message, a medium access control-control element, or downlink control information.

Aspect 7: The method of any of aspects 2 through 6, further comprising: receiving a message comprising an indication of the first threshold duration, the second threshold duration, or both, wherein the timer is started based at least in part on the indication.

Aspect 8: The method of aspect 7, wherein the message comprises a radio resource control message, a system information message, downlink control information, or a medium access control message, or any combination thereof.

Aspect 9: The method of any of aspects 1 through 8, further comprising: receiving a SR configuration that includes a field indicating whether the timer is to be started at a time that satisfies the first threshold duration prior to an SSB transmission occasion of the periodic SSB transmission occasions, wherein starting the timer is based at least in part on the field of the SR configuration.

Aspect 10: The method of any of aspects 1 through 8, further comprising: transmitting a request associated with starting the timer prior to the first SSB transmission occasion; and receiving, in response to the request, a message indicating that the timer is to be started at the first time based at least in part on the request.

Aspect 11: The method of any of aspects 1 through 10, further comprising: monitoring for the uplink grant for a duration of the timer based at least in part on starting the timer; and transmitting the uplink transmission based at least in part on receiving the uplink grant during the duration of the timer.

Aspect 12: The method of any of aspects 1 through 10, further comprising: monitoring for the uplink grant during a duration of the timer based at least in part on starting the timer; and transmitting a second SR based at least in part on failing to receive the uplink grant during the duration of the timer.

Aspect 13: The method of any of aspects 1 through 12, further comprising: entering a sleep mode after transmitting the first SR; and exiting the sleep mode prior to starting the timer.

Aspect 14: The method of any of aspects 1 through 13, further comprising: refraining from transmitting one or more additional SRs until the timer expires.

Aspect 15: A method for wireless communication, comprising: identifying an SSB timing for transmitting one or more SSBs to a UE in accordance with periodic SSB transmission occasions; receiving, from the UE, a SR that requests an uplink grant for an uplink transmission by the UE; and transmitting, to the UE and based at least in part on receiving the SR, the uplink grant during a duration of a timer, wherein the timer is started at a first time satisfying a first threshold duration prior to a start of a first SSB transmission occasion of the periodic SSB transmission occasions.

Aspect 16: The method of aspect 15, wherein the SR is received at a second time that satisfies a second threshold duration after a second SSB transmission occasion of the periodic SSB transmission occasions, the second SSB transmission occasion preceding the first SSB transmission occasion.

Aspect 17: The method of aspect 16, further comprising: transmitting, to the UE, a first control message indicating a configuration associated with selecting a first value for the first threshold duration, a second value for the second threshold duration, or both, based at least in part on a quantity of one or more logical channels for which data is available for transmission by the UE.

Aspect 18: The method of aspect 17, further comprising: transmitting, to the UE, a second control message indicating whether the UE is to select the first value, the second value, or both based at least in part on the quantity of one or more logical channels.

Aspect 19: The method of aspect 18, wherein the second control message comprises a radio resource control message, a medium access control-control element, or downlink control information.

Aspect 20: The method of any of aspects 16 through 19, further comprising: transmitting a message comprising an indication of the first threshold duration, the second threshold duration, or both, wherein the timer is started based at least in part on the indication.

Aspect 21: The method of aspect 20, wherein the message comprises a radio resource control message, a system information message, downlink control information, or a medium access control message, or any combination thereof.

Aspect 22: The method of any of aspects 15 through 21, further comprising: transmitting, to the UE, a SR configuration that includes a field indicating whether the timer is to be started at a time that satisfies the first threshold duration prior to an SSB transmission occasion of the periodic SSB transmission occasions.

Aspect 23: The method of any of aspects 15 through 22, further comprising: receiving the uplink transmission based at least in part on transmitting the uplink grant during the duration of the timer.

Aspect 24: The method of any of aspects 15 through 23, further comprising: entering a sleep mode after receiving the SR; and exiting the sleep mode prior to transmitting the uplink grant.

Aspect 25: The method of any of aspects 15 through 24, further comprising: receiving a request associated with starting the timer prior to the first SSB transmission occasion; and transmitting, in response to the request, a message indicating that the timer is to be started at the first time based at least in part on the request.

Aspect 26: An apparatus for wireless communication at a UE, comprising a processor and a memory coupled with the processor, with instructions stored in the memory. The instructions may be executable by the processor to cause the apparatus to perform a method of any of aspects 1 through 14.

Aspect 27: An apparatus for wireless communication at a UE, comprising at least one means for performing a method of any of aspects 1 through 14.

Aspect 28: A non-transitory computer-readable medium storing code for wireless communication at a UE, the code comprising instructions executable by a processor to perform a method of any of aspects 1 through 14.

Aspect 29: An apparatus for wireless communication, comprising a processor and a memory coupled with the processor, with instructions stored in the memory. The instructions may be executable by the processor to cause the apparatus to perform a method of any of aspects 15 through 25.

Aspect 30: An apparatus for wireless communication, comprising at least one means for performing a method of any of aspects 15 through 25.

Aspect 31: A non-transitory computer-readable medium storing code for wireless communication, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

a processor; and a memory coupled with the processor, with instructions stored in the memory, the instructions being executable by the processor to cause the apparatus to:

identify a synchronization signal block timing for receiving one or more synchronization signal blocks from a network entity in accordance with periodic synchronization signal block transmission occasions;

transmit, to the network entity, a first scheduling request that requests an uplink grant for an uplink transmission by the UE;

start a timer associated with monitoring for the uplink grant from the network entity based at least in part on transmitting the first scheduling request, wherein the timer is started after the first scheduling request is transmitted and at a first time satisfying a first threshold duration prior to a first synchronization signal block transmission occasion of the periodic synchronization signal block transmission occasions;

monitor for the uplink grant for a duration of the timer based at least in part on starting the timer; and transmit the uplink transmission based at least in part on receiving the uplink grant during the duration of the timer.

2. The apparatus of claim 1, wherein the instructions are further executable by the processor to cause the apparatus to:

determine that the first scheduling request is transmitted at a second time that satisfies a second threshold duration after a second synchronization signal block transmission occasion of the periodic synchronization signal block transmission occasions, the second synchronization signal block transmission occasion preceding the first synchronization signal block transmission occasion, wherein the timer is started based at least in part on transmitting the first scheduling request at the second time.

3. The apparatus of claim 2, wherein the instructions are further executable by the processor to cause the apparatus to:

select a first value for the first threshold duration or a second value for the second threshold duration, or both, based at least in part on a quantity of one or more logical channels for which data is available for transmission by the UE.

4. The apparatus of claim 3, wherein the instructions are further executable by the processor to cause the apparatus to: receive a first control message indicating a configuration of the first value or the second value, or both, wherein selecting the first value or the second value, or both, is based at least in part on the configuration.

5. The apparatus of claim 4, wherein the instructions are further executable by the processor to cause the apparatus to: receive a second control message indicating whether the UE is to select the first value, the second value, or both based at least in part on the quantity of the one or more logical channels, wherein selecting the first value or the second value, or both, is based at least in part on the second control message.

6. The apparatus of claim 5, wherein the second control message comprises a radio resource control message, a medium access control-control element, or downlink control information.

7. The apparatus of claim 2, wherein the instructions are further executable by the processor to cause the apparatus to: receive a message comprising an indication of the first threshold duration, the second threshold duration, or both, wherein the timer is started based at least in part on the indication.

8. The apparatus of claim 7, wherein the message comprises a radio resource control message, a system information message, downlink control information, or a medium access control message, or any combination thereof.

9. The apparatus of claim 1, wherein the instructions are further executable by the processor to cause the apparatus to: receive a scheduling request configuration that includes a field indicating whether the timer is to be started at a time that satisfies the first threshold duration prior to a synchronization signal block transmission occasion of the periodic synchronization signal block transmission occasions, wherein starting the timer is based at least in part on the field of the scheduling request configuration.

10. The apparatus of claim 1, wherein the instructions are further executable by the processor to cause the apparatus to: transmit a request associated with starting the timer prior to the first synchronization signal block transmission occasion; and receive, in response to the request, a message indicating that the timer is to be started at the first time based at least in part on the request.

11. The apparatus of claim 1, wherein the instructions are further executable by the processor to cause the apparatus to: transmit a second scheduling request based at least in part on failing to receive the uplink grant during the duration of the timer.

12. The apparatus of claim 1, wherein the instructions are further executable by the processor to cause the apparatus to: enter a sleep mode after transmitting the first scheduling request; and exit the sleep mode prior to starting the timer.

13. The apparatus of claim 1, wherein the instructions are further executable by the processor to cause the apparatus to: refrain from transmitting one or more additional scheduling requests until the timer expires.

14. An apparatus for wireless communication, comprising: a processor; and a memory coupled with the processor, with instructions stored in the memory, the instructions being executable by the processor to cause the apparatus to: identify a synchronization signal block timing for transmitting one or more synchronization signal blocks to a user equipment (UE) in accordance with periodic synchronization signal block transmission occasions; receive, from the UE, a scheduling request that requests an uplink grant for an uplink transmission by the UE; transmit, to the UE and based at least in part on receiving the scheduling request, the uplink grant during a duration of a timer, wherein the timer is started at a first time satisfying a first threshold duration prior to a start of a first synchronization signal block transmission occasion of the periodic synchronization signal block transmission occasions; and receive, from the UE, the uplink transmission based at least in part on transmitting the uplink grant during the duration of the timer.

15. The apparatus of claim 14, wherein the scheduling request is received at a second time that satisfies a second threshold duration after a second synchronization signal block transmission occasion of the periodic synchronization signal block transmission occasions, the second synchronization signal block transmission occasion preceding the first synchronization signal block transmission occasion.

16. The apparatus of claim 15, wherein the instructions are further executable by the processor to cause the apparatus to: transmit, to the UE, a first control message indicating a configuration associated with selecting a first value for the first threshold duration, a second value for the second threshold duration, or both, based at least in part on a quantity of one or more logical channels for which data is available for transmission by the UE.

17. The apparatus of claim 16, wherein the instructions are further executable by the processor to cause the apparatus to: transmit, to the UE, a second control message indicating whether the UE is to select the first value, the second value, or both based at least in part on the quantity of one or more logical channels.

18. The apparatus of claim 17, wherein the second control message comprises a radio resource control message, a medium access control-control element, or downlink control information.

19. The apparatus of claim 15, wherein the instructions are further executable by the processor to cause the apparatus to: transmit a message comprising an indication of the first threshold duration, the second threshold duration, or both, wherein the timer is started based at least in part on the indication.

20. The apparatus of claim 19, wherein the message comprises a radio resource control message, a system information message, downlink control information, or a medium access control message, or any combination thereof.

21. The apparatus of claim 14, wherein the instructions are further executable by the processor to cause the apparatus to: transmit, to the UE, a scheduling request configuration that includes a field indicating whether the timer is to be started at a time that satisfies the first threshold duration prior to a synchronization signal block transmission occasion of the periodic synchronization signal block transmission occasions.

22. The apparatus of claim 14, wherein the instructions are further executable by the processor to cause the apparatus to:

enter a sleep mode after receiving the scheduling request; and exit the sleep mode prior to transmitting the uplink grant.

23. The apparatus of claim 14, wherein the instructions are further executable by the processor to cause the apparatus to:

receive a request associated with starting the timer prior to the first synchronization signal block transmission occasion; and transmit, in response to the request, a message indicating that the timer is to be started at the first time based at least in part on the request.

24. A method for wireless communication at a user equipment (UE), comprising:

identifying a synchronization signal block timing for receiving one or more synchronization signal blocks from a network entity in accordance with periodic synchronization signal block transmission occasions;

transmitting, to the network entity, a first scheduling request that requests an uplink grant for an uplink transmission by the UE;

starting a timer associated with monitoring for the uplink grant from the network entity based at least in part on transmitting the first scheduling request, wherein the timer is started after the first scheduling request is transmitted and at a first time satisfying a first threshold duration prior to a first synchronization signal block transmission occasion of the periodic synchronization signal block transmission occasions;

monitoring for the uplink grant for a duration of the timer based at least in part on starting the timer; and transmitting the uplink transmission based at least in part on receiving the uplink grant during the duration of the timer.

25. The method of claim 24, further comprising:

determining that the first scheduling request is transmitted at a second time that satisfies a second threshold duration after a second synchronization signal block transmission occasion of the periodic synchronization signal block transmission occasions, the second synchronization signal block transmission occasion preceding the first synchronization signal block transmission occasion, wherein the timer is started based at least in part on transmitting the first scheduling request at the second time.

26. The method of claim 25, further comprising:

selecting a first value for the first threshold duration or a second value for the second threshold duration, or both, based at least in part on a quantity of one or more logical channels for which data is available for transmission by the UE.

27. A method for wireless communication, comprising:

identifying a synchronization signal block timing for transmitting one or more synchronization signal blocks to a user equipment (UE) in accordance with periodic synchronization signal block transmission occasions;

receiving, from the UE, a scheduling request that requests an uplink grant for an uplink transmission by the UE;

transmitting, to the UE and based at least in part on receiving the scheduling request, the uplink grant during a duration of a timer, wherein the timer is started at a first time satisfying a first threshold duration prior to a start of a first synchronization signal block transmission occasion of the periodic synchronization signal block transmission occasions; and receiving, from the UE, the uplink transmission based at least in part on transmitting the uplink grant during the duration of the timer.

28. The method of claim 27, wherein the scheduling request is received at a second time that satisfies a second threshold duration after a second synchronization signal block transmission occasion of the periodic synchronization signal block transmission occasions, the second synchronization signal block transmission occasion preceding the first synchronization signal block transmission occasion.

* * * * *